United States Patent [19]

Stauffer

[11] 3,958,117

[45] May 18, 1976

[54] DISTANCE DETERMINING AND AUTOMATIC FOCUSING APPARATUS

[75] Inventor: Norman L. Stauffer, Englewood, Colo.

[73] Assignee: Honeywell Inc., Minneapolis, Minn.

[22] Filed: July 15, 1975

[21] Appl. No.: 596,059

[52] U.S. Cl. .............................. 250/201; 250/209; 250/578; 356/4; 354/25
[51] Int. Cl.² ......................................... G01J 1/20
[58] Field of Search .......... 250/201, 204, 208, 209, 250/216; 354/22, 23, 25; 356/4, 125; 353/101

[56] References Cited
UNITED STATES PATENTS

| 3,274,914 | 9/1966 | Biedermann et al. | 250/209 X |
|---|---|---|---|
| 3,450,883 | 6/1969 | Thomas | 250/204 |
| 3,493,764 | 2/1970 | Craig | 353/101 X |
| 3,610,934 | 10/1974 | Turner | 250/201 |
| 3,682,071 | 8/1972 | Hojoe | 356/4 X |
| 3,684,374 | 8/1972 | Humphrey | 356/4 |
| 3,708,619 | 1/1973 | Martin | 353/101 |
| 3,723,003 | 3/1973 | Vockenhuber et al. | 250/201 X |
| 3,733,989 | 5/1973 | Wick et al. | 250/209 X |
| 3,792,260 | 2/1974 | Bieake et al. | 250/216 |
| 3,846,628 | 11/1974 | Towne | 250/201 |

Primary Examiner—Walter Stolwein
Attorney, Agent, or Firm—George E. Bodenstein

[57] ABSTRACT

A primary lens, which forms a primary image of an object on an image plane, is arranged to be positioned by a lens focusing motor. First and second auxiliary optical elements, which may be lenses or mirrors, produce respective first and second detection images of the object on respective first and second arrays of light sensors. One of these elements is reciprocated in continuously repeated periods or cycles to move its image back and forth continuously on the corresponding array. A signal processing circuit receives the outputs of the light sensors and produces a correlation pulse each time that the cycling element occupies the correlation position at which it brings the light distributions of the images into best correspondence on the respective arrays. The time and element position in each cycle at which this occurs are measures of the object distance. A circuit responds to the correlation pulse and to the relative positions of the cycling element and the primary lens, and controls the motor to make the final position of the primary lens correspond to the correlation position of the cycling element, this final position causing the primary image to be in best focus on the image plane. The relative positions of the cycling element and the primary lens are ascertained by magnetically actuated devices, by a mechanically operated switch, by a light operated switch, or by an arrangement which compares an element position signal to a primary lens position signal.

18 Claims, 9 Drawing Figures

DISTANCE DETERMINING AND AUTOMATIC FOCUSING APPARATUS

CROSS-REFERENCES TO RELATED APPLICATIONS

Subject matter disclosed but not claimed herein is disclosed and claimed in the copending Stauffer application Ser. No. 529,573, filed Dec. 4, 1974.

BACKGROUND OF THE INVENTION

1. Field of the Invention

The present invention relates generally to apparatus for providing a measure of the distance between the apparatus and an object, and to such apparatus when coupled with primary optical means to cause the latter automatically to keep an image of the object, which is produced on an image plane by the optical means, in focus on that plane for a range of object distances. Specifically, the invention relates to the so-called spatial image correlation type or form of such apparatus, wherein the object distance is determined by relatively moving auxiliary image-producing auxiliary optical means and radiation responsive arrays until they occupy a critical or correlation position, this position being a measure of the existing object distance.

2. Description of the Prior Art

Distance determining and automatic focusing arrangements of the spatial image correlation type noted above have been proposed in the past. In each of these arrangements, the auxiliary optical means and the radiation responsive arrays, or detector arrays, are moved relatively, for each distance measuring or focusing operation, until there is best correspondence between the radiation distributions of the two auxiliary or detection images which the auxiliary optical means form on respective ones of the arrays. This condition of best distribution correspondence is identifiable by its production of a unique value or predetermined effect in the processed electrical output signal derived from the output signals of the elements which make up the arrays. For convenience, the said relative movement is generally achieved by moving or positioning a portion or member of the auxiliary optical means, such as a lens or a mirror, relative to the corresponding one of the arrays.

The particular position of the moved auxiliary optical member, in its range of movement, which yields the said best distribution correspondence and predetermined output signal effect is referred to as the correlation position for the existing object distance, and is unique to that distance. Accordingly, there is a correlation position of the moved auxiliary optical member for each object distance within the operating range of the apparatus. Thus, the recognition or detection of these correlation positions provides a measure, representation, or indication of the object distance.

Where the automatic focusing of a primary optical means, such as a camera taking lens, is effected by the apparatus just described, this means is moved and positioned along with the auxiliary optical means, the coupling between these two means being such that, when they are in the correlation position, the primary image of the object produced by the primary optical means is in best focus on an image plane.

Examples of different forms of arrangements of the type described above are found in the above-listed copending Stauffer application, in the Stauffer U.S. Pat. Nos. 3,836,772 and 3,838,275, and in the Biedermann et al. U.S. Pat. No. 3,274,914. In the Stauffer arrangements, an auxiliary lens or mirror and a primary lens coupled thereto are moved together, each time that the object distance changes, from a former correlation and focus position for the old object distance to a new correlation and focus position for the new object distance. In the Biedermann et al. form of apparatus, an auxiliary mirror and a coupled primary lens are moved together, each time that a focusing operation is initiated, from a datum position (the infinity focus position of the lens) to the position in which image correlation is achieved for the existing object distance. Subsequently, the mirror and lens are moved back to the datum position, ready for the next focusing operation.

Although the known apparatus, exemplified by the arrangements just described, doubtless has practical utility for certain applications, it is nevertheless characterized by certain shortcomings. Specifically, the Biedermann et al. type of apparatus is incapable of providing so-called focus following operation, that is, continual movement of the primary lens as necessary to maintain it in a focused condition when the object distance is varying. Such capability is required, for example, when the adjusted primary lens is that of a motion picture camera. The incapability of the Biedermann et al. type of apparatus to provide focus following operation stems from the need for returning the mirror and the primary lens of that apparatus to the datum position each time that the lens is to be moved to a new focus position.

The arrangements of the noted Stauffer patents are capable of keeping a primary lens in a focused condition as the object distance varies. However, these arrangements require a rather complex light responsive and signal switching and conditioning or processing means in order to accomplish this operation, the use of which is prohibited in those applications where small size and low cost are mandatory.

A further shortcoming of the known apparatus is its requirement that the primary lens be coupled to and moved along with the auxiliary lens or mirror. Such coupled movement of these elements places a limitation on the speed with which the auxiliary means can be moved or scanned through its range of positions while seeking that position in which correlation is obtained. This limitation is a significant one in some applications.

SUMMARY OF THE INVENTION

Accordingly, it is an object of the present invention to provide improved spatial image correlation type distance measuring and automatic focusing apparatus which is not subject to the noted shortcomings of the previously known apparatus, and which thus continually follows and measures changes in the distance to an object without being unduly complex, large, or costly. A more specific object of the invention is to provide such improved apparatus which is capable of rapidly moving a primary optical element, such as a camera lens, from one focus position to another as the distance to an object changes, thereby keeping the primary optical element in a focused condition with respect to the object as the object distance varies.

In accordance with the present invention, the foregoing and other desirable objects are accomplished by the inclusion in said improved apparatus of a first means for relatively moving the auxiliary optical means and the radiation responsive arrays independently of any primary optical element or other means, and by the inclusion of additional means, such as servo means, for separately moving or positioning a member, which may be a primary optical element, to appropriate positions corresponding to ascertained correlation positions of the auxiliary optical means and arrays. Specifically, in one illustrated preferred embodiment of the invention, the said first means is a scanning means which moves one of a pair of auxiliary detection image-producing lenses through a range of positions which includes those at which image correlation is achieved and detected for different object distances. This apparatus also includes the said additional means in the form of servo means which separately move a primary lens to positions corresponding to the detected correlation positions of the moved auxiliary lens. Thus, during each movement of the auxiliary lens through its range of positions, this lens passes through a correlation position for the existing object distance, and the servo means then separately adjusts or positions the primary lens as necessary to make its position correspond to the ascertained correlation position of the auxiliary lens. The apparatus is calibrated to cause this adjusted position of the primary lens to be such that the image of the object which this lens then produces is in best focus for this particular object distance. According to an additional aspect of the invention, the scanning means moves the auxiliary lens continuously, so that this lens is moved or swept through its range of positions during each of continuously repeated time periods. In other forms of the illustrated preferred embodiment of the invention, an auxiliary mirror is moved instead of the auxiliary lens.

BRIEF DESCRIPTION OF THE DRAWING

A better understanding of the present invention may be had from the following detailed description when read in connection with the accompanying drawing, wherein:

FIG. 7 is an operational curve diagram illustrating the operation of the FIG. 6 apparatus.

DETAILED DESCRIPTION OF THE PREFERRED EMBODIMENT

THE APPARATUS OF FIG. 1

Figure 1:
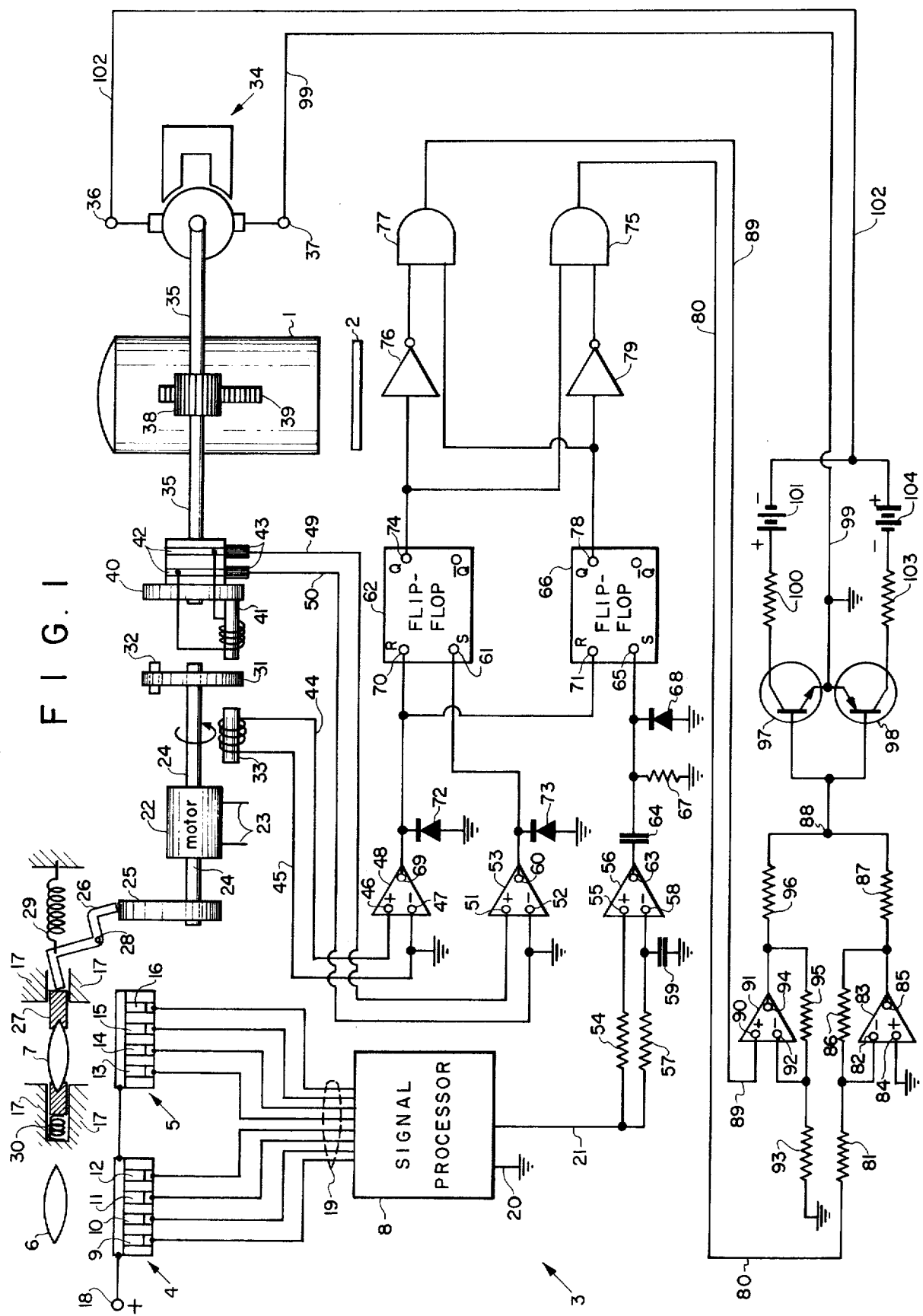
FIG. 1 is a diagrammatic representation of spatial image correlation automatic focusing apparatus embodying the present invention.

The apparatus shown in FIG. 1, and illustrating a preferred example of apparatus embodying the present invention, is automatic focusing apparatus which is designed to maintain a primary lens 1 in a focused condition with respect to an image plane 2 as the distance varies between the plane 2 and an object or scene, now shown. This distance is hereinafter referred to as the object distance. Specifically, the FIG. 1 apparatus automatically repositions the lens 1 as necessary to keep a primary image of the object, which the lens 1 produces on the plane 2, in best focus on the latter as the object distance varies. The lens 1 may well be the taking lens of a photographic camera of either the motion picture or the still type, and the plane 2 may well be the film plane of such a camera. Ths shutter and other portions which such a camera would include have been omitted from the FIG. 1 showing in order to avoid unduly complicating the figure, the illustration of such portions not being necessary to an understanding of the present invention or its embodiments.

The FIG. 1 apparatus includes an image correlation portion 3 of the type disclosed in the said Stauffer application. This portion includes a first radiation or light responsive detector array 4, a second radiation or light responsive detector array 5, a first auxiliary lens 6, a second auxiliary lens 7, and a signal processor 8. The arrays 4 and 5 are coplanar, and each is made up of four light responsive elements which may well be, and will be assumed herein to be, photodiodes. Thus, the array 4 includes elements 9, 10, 11, and 12, and the array 5 includes elements 13, 14, 15, and 16. Each of the arrays 4 and 5 is of the type illustrated in FIGS. 1 and 14 of the said Stauffer application and, as noted therein, may include more elements than the four illustrated, if a degree of accuracy higher than that afforded by four elements is desired.

The lens 6 is arranged to form a first auxiliary or detection image of the object on the light responsive faces of the elements of the array 4, and the lens 7 is arranged to form a second auxiliary or detection image of the object on the light responsive faces of the elements of the array 5. The lens 6 is fixed in position relative to the array 4, but the lens 7 is movable relative to the array 5, within guideways 17, in a manner which will be described hereinafter.

As in the case of the apparatus disclosed in the said Stauffer application, the angle of view of each of the lenses 6 and 7 is made to be the same as that of the other, and is desirably made to be relatively small, of the order of 1° to 10°. Also, these lenses are so constructed and oriented with respect to the arrays 4 and 5 and the lens 1 that the image formed by the lens 6 on the array 4 is substantially identical to the image formed by the lens 7 on the array 5. In other words, each of these two detection images represents the same portion of the entire primary image which is formed on the plane 2 by the lens 1.

It is noted that it is not necessary that the two detection images be in focus on the corresponding arrays. All that is required is that each of these images has a distinguishable spatial radiation, or light, distribution on its corresponding array.

One terminal of each of the elements 9 through 16 is connected to the positive supply terminal 18 of a suitable bias power source, not shown. The negative terminal of this source is connected to apparatus common or ground. The other terminal of each of the elements 9 through 16 is connected by a corresponding one of conductors 19 to a corresponding input connection within the signal processor 8. The latter has a conductor 20 connected to ground, and produces an output signal between an output conductor 21 and the grounded conductor 20.

The signal processor 8 may well be of the form illustrated by way of example in FIG. 2, and will be so described in detail hereinafter. It is sufficient to note at this point that the processor 8 compares the output signal of each of the elements of the array 4 with the output signal of the corresponding element of the array 5, this correspondence being based upon the relative location of each element with respect to the array of which it forms a part. The processor 8 then causes the output signal between the conductor 21 and the grounded conductor 20 to attain a minimum value each time that the light distribution of the image on the array 4 best corresponds to the light distribution of the image on the array 5. As will be explained more fully hereinafter, such best correspondence of the two image light distributions, and such a minimum value of the processor output signal, occurs each time that the lens 7 is in a correlation position, i.e., the position which represents the existing object distance.

The lens 7 is continuously moved back and forth within the guideways 17 between a right-hand limit position and a left-hand limit position, these positions establishing the range of travel of the lens 7. The guideways 17 are so positioned that this movement of the lens 7 takes place in a plane parallel to that of the array 5. Thus, the lens 7 is caused to move progressively in its plane through a range of positions relative to the array 5 during each of continuously repeated time periods.

The above-described motion of the lens 7 is produced by a scanning means including a motor 22. The latter is desirably energized by way of conductors 23 so as to rotate a shaft 25 at a suitable constant speed. As viewed toward the left in FIG. 1, the shaft 24 is assumed to rotate in a counter-clockwise direction.

An eccentric cam 25 is fixed to the left-hand end of the shaft 24. A follower lever 26 extends between the periphery of the cam 25 and one end of a mounting 27 for the lens 7. The lever 26 is mounted to turn about a pivot 28, and its lower end is biased into engagement with the periphery of the cam 25 by a tension spring 29. The lens 7 and its mounting 27 are biased into engagement with the upper end of the lever 26 by a compression spring 30. Accordingly, as the motor 22 operates, the lens 7 is continuously moved back and forth throughout its range of travel within its guideways 17.

A disk 31 is concentrically fixed to the right-hand end of the shaft 24. The disk 31 carries a permanent magnet 32. The several parts are so arranged that the magnet 32, in its path of rotation around the shaft 24, cooperatively passes a reference pickup coil 33 each time that the lens 7 is started on its travel from its extreme right-hand position. Accordingly, a reference pulse is produced by the coil 33 each time that the lens 7 begins to move toward the left away from its right-hand extreme of travel. In the particular position occupied by the parts as shown in FIG. 1, the lens 7 has been moved to its extreme left-hand position, and the magnet 32 is halfway, or 180°, from the position at which it produces a pulse in the coil 33.

As will be explained further hereinafter, the structure being described cooperates in ascertaining, for the existing object distance, the position to which the primary lens 1 is to be moved, within its range of positions or travel, in order to cause the primary image on the plane 2 to be in best focus for this object distance. The actual moving or adjusting of the lens 1 within its range of travel is effected by a reversible motor 34. The latter is coupled to the right-hand end of a shaft 35, and rotates this shaft in a direction dependent upon the polarity of a motor drive signal applied to motor terminals 36 and 37.

A pinion gear 38 is fixed to the shaft 35 in a position to mesh with a rack gear 39 which is secured to the holder or barrel of the lens 1. A disk 40 is concentrically fixed to the left-hand end of the shaft 35. The arrangement is such that the clockwise rotation of the motor 34, the shaft 35, and the disk 40, as viewed toward the left in FIG. 1, moves the lens 1 in or downward toward the plane 2 and toward the infinity focus limit position of the lens 1. Conversely, the counterclockwise rotation of the motor 34, the shaft 35, and the disk 40 moves the lens 1 out or upward away from the plane 2 and toward the close focus limit position of the lens 1.

A lens position-sensing pickup coil 41 is carried by the disk 40, the construction being such that the coil 41 makes a one-half, or 180°, counter-clockwise revolution along its circular path for movement of the lens 1 from its "in" or infinity focus limit position to its "out" or close focus limit position. The particular position of the lens 1 and the coil 41 shown in FIG. 1 is the infinity focus position.

The shafts 24 and 35 are arranged coaxially so that the circular path traced by the magnet 32, as the shaft 24 and the disk 31 rotate, is concentric with, and of the same diameter as, the circular path traced by the coil 41 when the shaft 35 and the disk 40 rotate. Additionally, the shafts 24 and 35 and the disks 31 and 40 are so axially spaced that a lens position pulse is produced by the coil 41 each time that the magnet 32, in its travel, passes the coil 41. Accordingly, the elapsed time between the production of a pulse by the coil 33 and the production of a pulse by the coil 41 is a measure of the instantaneous position of the lens 1 in its range of movement.

The necessary electrical connections to the coil 41 are made by means of a pair of slip rings 42 which are carried on a cylindrical extension of the disk 40. Each of the end conductors of the coil 41 is connected to a respective one of the slip rings 42, and the latter, in turn, are contacted by the respective ones of a pair of brushes 43. If desired, flexible conductors can be used instead of the illustrated slip ring and brush arrangement for making the necessary electrical connections to the coil 41.

The reference coil 33, the brushes 43 for the lens position coil 41, and the output conductors 20 and 21 of the signal processor 8 are connected to circuitry which controls the rotation of the motor 34, and hence the positioning of the lens 1, as dictated by the other portions of the apparatus. Specifically, the coil 33 is provided with conductors 44 and 45 which are connected to the respective input terminals 46 and 47 of an operational amplifier 48. The input terminal 47 is also connected to ground. The brushes 43 are connected to respective conductors 49 and 50 which are connected to the respective input terminals 51 and 52 of an operational amplifier 53. The input terminal 52 is also connected to ground.

The output conductor 21 of the signal processor 8 is connected through a resistor 54 to the non-inverting input terminal 55 of an operational amplifier 56. The conductor 21 is also connected through a resistor 57 to the inverting input terminal 58 of the amplifier 56, and this latter terminal is also connected through a capacitor 59 to ground and hence to the other output conductor 20 of the signal processor 8. As will be more fully explained hereinafter, the arrangement including the amplifier 56 as just described forms a change of slope detector which detects the arrival of the output signal of the processor 8 at a minimum value, and hence detects the correlation position of the lens 7 in its travel.

The output terminal 60 of the amplifier 53 is connected to the SET terminal 61 of an RS flip-flop 62. The output terminal 63 of the amplifier 56 is connected through the capacitor 64 of a high pass filter or differentiator to the SET terminal 65 of an RS flip-flop 66. The terminal 65 is also connected to ground through a resistor 67 of said filter. A diode 68 connects the terminal 65 to ground to cause the flip-flop 66 to be set only by positive signals from the amplifier 56.

The output terminal 69 of the amplifier 48 is connected to the RESET terminal 70 of the flip-flop 62, and to the RESET terminal 71 of the flip-flop 66. Diodes 72 and 73 are connected to the respective amplifier output terminals 69 and 60 to prevent other than positive signals from passing to the flip-flops.

The Q output terminal 74 of the flip-flop 62 is connected directly to one of the inputs of an AND gate 75, and is connected through an inverter 76 to one of the inputs of an AND gate 77. Similarly, the Q output terminal 78 of the flip-flop 66 is connected directly to the other input of the AND gate 77, and is connected through an inverter 79 to the other input of the AND gate 75.

The output of the AND gate 75 is connected by a conductor 80 and a resistor 81 to the inverting input terminal 82 of an operational amplifier 83. The non-inverting input terminal 84 of the amplifier 83 is connected to ground. The output terminal 85 of the amplifier 83 is connected through a feedback resistor 86 to the input terminal 82, and is connected through a resistor 87 to a junction point 88. Further, the output of the AND gate 77 is connected by a conductor 89 to the non-inverting input terminal 90 of an operational amplifier 91. The inverting input terminal 92 of the amplifier 91 is connected to ground through a resistor 93, and is connected to the amplifier output terminal 94 through a feedback resistor 95. The output terminal 94 is connected through a resistor 96 to the point 88.

The point 88 is connected to the base of an NPN transistor 97 and to the base of a PNP transistor 98. The emitters of the two transistors are connected together and to a grounded conductor 99 which in turn is connected to the terminal 37 of the motor 34. The collector of the transistor 97 is connected through a resistor 100 to the positive terminal of an ungrounded power source, shown as a battery 101, and the negative terminal of the latter is connected by a conductor 102 to the terminal 36 of the motor 34. The collector of the transistor 98 is connected through a resistor 103 to the negative terminal of another ungrounded power source, shown as a battery 104, the positive terminal of which is connected to the conductor 102.

The circuit including the amplifiers 83 and 91 and the transistors 97 and 98 is a motor drive circuit for the motor 34 which is controlled by the AND gates 75 and 77. The described construction of this circuit is such that, when the outputs of both of the gates 75 and 77 are zero, no voltage is supplied to the motor terminals 36 and 37, and the motor 34 and the lens 1 remain at rest. An output signal from the gate 75 causes the amplifier 83 to drive the gates of the transistors 97 and 98 negative, thereby turning on the transistor 98 and establishing a motor drive signal which makes the motor terminal 36 positive. This causes the motor 34 to rotate in a counter-clockwise direction and to move the lens 1 out or away from the plane 2. Conversely, an output signal from the gate 77 causes the amplifier 91 to drive the transistor gates positive. This turns on the transistor 97 and establishes a motor drive signal which makes the motor terminal 36 negative. Under this condition the motor 34 rotates in a clockwise direction and moves the lens in toward the plane 2.

A detailed description of the operation of the FIG. 1 apparatus as just structurally described appears below, following the description of the construction of the FIG. 2 form for the signal processor 8 now to be provided.

THE APPARATUS OF FIG. 2

Figure 2:
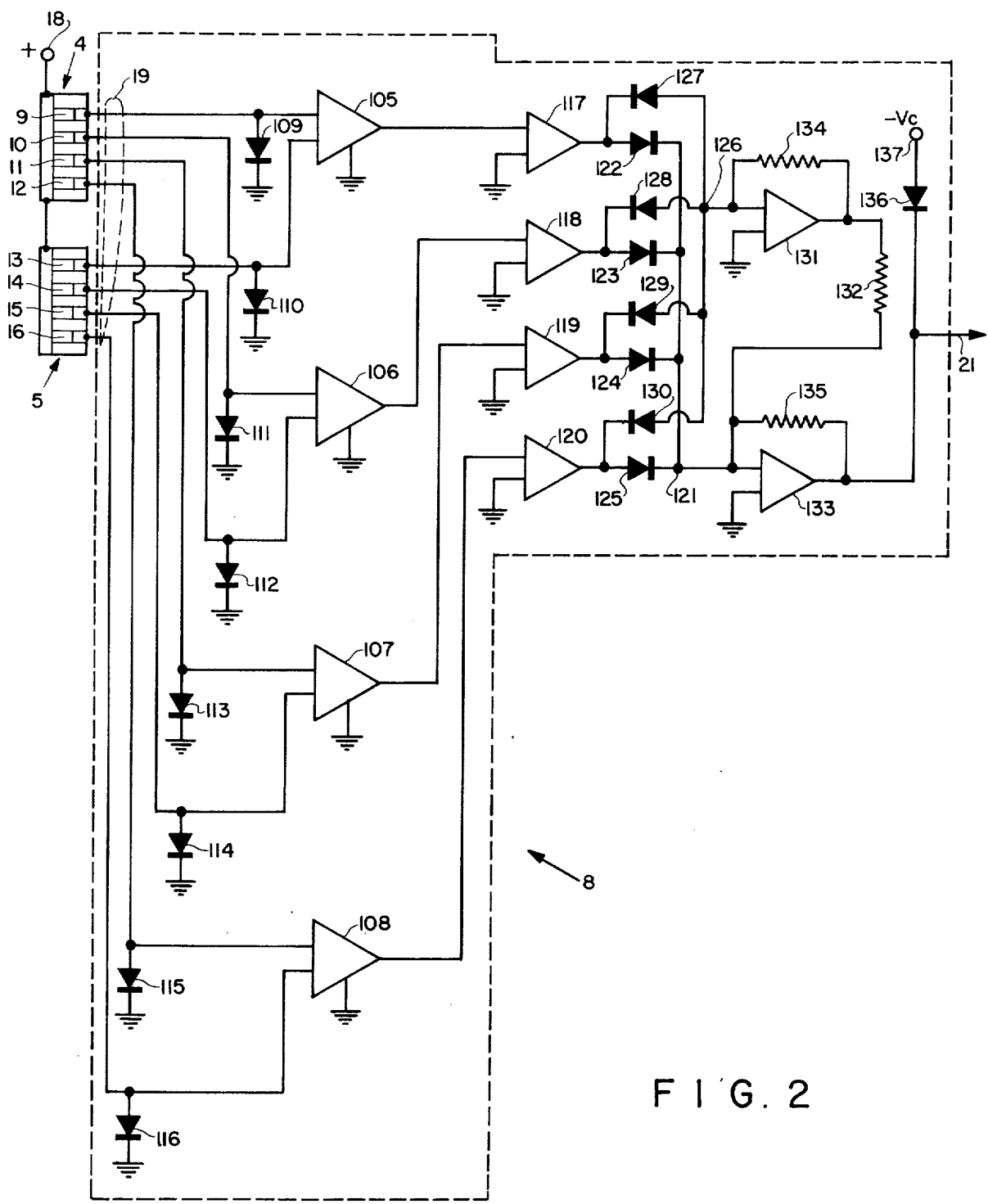
FIG. 2 is a schematic circuit diagram of one form which the signal processor portion of the FIG. 1 apparatus may take.

As previously noted, FIG. 2 illustrates one form which the signal processor 8 of the FIG. 1 apparatus desirably may take. This illustrated form of processor is that which is shown in FIGS. 12 and 14 of the said Stauffer application.

In FIG. 2, the conductors 19 are shown connecting the light responsive elements 9 through 12 of the array 4 in pairs with the positionally-corresponding elements 13 through 16 of the array 5 to the inputs of four differential amplifiers 105 through 108. Specifically, the elements 9 and 13 are connected to respective inputs of the amplifier 105, the elements 10 and 14 are connected to responsive inputs of the amplifier 106, the elements 11 and 15 are connected to respective inputs of the amplifier 107, and the elements 12 and 16 are connected to respective inputs of the amplifier 108. The common terminals of the amplifiers 105 through 108 are connected to ground.

A respective one of diodes 109 through 116 is connected between each of the amplifier inputs and ground to cause the element output signals as applied to the amplifier inputs to represent the logs of the light intensitites on the corresponding elements. This is done to make the output signals of the amplifiers 105 through 108 essentially independent, within wide limits, of the absolute level of the light of the detection images falling on the arrays 4 and 5.

The output of each of the amplifiers 105 through 108 is connected across the input of a corresponding one of amplifiers 117 through 120. The output of each of the amplifiers 117 through 120 is connected to a common point 121 through the anode-cathode path of a respective one of diodes 122 through 125. Also, the output of each of the amplifiers 117 through 120 is connected to a common point 126 through the cathode-anode path of a respective one of diodes 127 through 130.

The point 126 is connected to one input of an amplifier 131, the other input of which is connected to ground. The output of the amplifier 131 is connected through a resistor 132 to one input of an amplifier 133, to which input the point 121 is also connected. The other input of the amplifier 133 is connected to ground. The output of the amplifier 133 is connected to the output conductor 21. A feedback resistor 134 is connected between the output and the ungrounded input of the amplifier 131, and a feedback resistor 135 is connected between the output and the ungrounded input of the amplifier 133. A voltage clamping diode 136 is connected between the negative terminal 137 of a suitable bias power source, not shown, and the conductor 21 to prevent minor dips from appearing in the output signal on the conductor 21.

As is explained in detail in the said Stauffer application, the construction of the signal processor 8 as just described causes the output signal of each of the amplifiers 105 through 108 to a resultant signal which represents the ratio of the intensitites of the light falling on the elements of the pair of elements which is connected to that amplifier. These resultant signals are made positive, as necessary, and the four positive signals are summed to form the output signal between the conductor 21 and ground. Each of these resultant signals attains a minimum value when the two light sensitive elements which produce it are most similarly illuminated, and this is why the output signal on the conductor 21 attains a minimum value when there is best correspondence between the light distributions of the two detection images on the arrays 4 and 5.

OPERATION OF THE APPARATUS OF FIGS. 1 AND 2

In connection with the following description of the operation of the FIG. 1 apparatus employing the signal processor circuit of FIG. 2, it is desirable that the following criteria be kept in mind:

1. At the start of each cycle of movement or scanning cycle of the lens 7 produced by the constant counter-clockwise rotation of the motor 22, the magnet 32 causes the reference coil 33 to produce a reference pulse at the input of the amplifier 48, and the cam 25 starts to move the lens 7 toward the left, away from its right-hand limit position. This movement of the lens 7 continues until the cam 25 has rotated 180° and has reached the high position shown in FIG. 1, at which time the lens 7 stops moving at its left-hand limit position. This is the so-called useful travel portion of each scanning cycle for the lens 7.

2. The continued rotation of the cam 25 moves the lens 7 back to its right-hand limit position. This is the so-called return travel portion of each scanning cycle for the lens 7. Upon this return of the lens 7 to its right-hand limit position, the scanning cycle is repeated.

3. As the lens 7 moves progressively toward the left and then toward the right, the image which the lens 7 forms moves correspondingly toward the left and then toward the right on the array 5, for any given object distance.

4. For any given position of the lens 7, the two images formed on the respective arrays 4 and 5 move apart as the object distance decreases, and move together as the object distance increases. Thus, the smaller or shorter this distance is, the further the image on the array 4 will be toward the left, and the further the image on the array 5 will be toward the right.

5. As the lens 7 is moved progressively toward the left during its useful travel, it will reach, and pass through, a position at which the light distribution of the image on the array 5 best corresponds to the light distribution of the image on the array 4. This is the correlation position of the lens 7 for the existing object distance, and this particular position thus represents this particular object distance. The attainment of this best light distribution correspondence is manifested by the attainment of a minimum value by the output signal on the conductor 21.

6. The movement of the lens 7 toward the left which takes place during its useful travel moves the image on the array 5 in the same direction as the image on the array 4 is moved by a decreasing object distance. Thus, the smaller the object distance, the further the lens 7 will be toward the left at the time that it temporarily brings the two light distributions into best correspondence and thus temporarily occupies the correlation position for the existing object distance.

FIRST OPERATING EXAMPLE

The operation of the FIG. 1 apparatus will now be illustrated by considering two different examples of typical situations. For the first of these situations, let it be assumed that the object was at a considerable distance from the plane 2, say 30 feet, at the time that the motor 34 last positioned the primary lens 1 so that the latter occupied its so-called focus position, that is, the position at which the image on the plane 2 is in best focus thereon. Let is be further assumed that the object has just become considerably closer to the plane 2, say 10 feet therefrom. This means that the lens 1 must now be moved out, or away from the plane 2, in order for it to be in its focus position for the new, closer object position and shorter object distance. As noted previously, such a decrease in the object distance will have moved the two detection images apart, whereby the lens 7 will now be farther to the left than before in its useful travel when it reaches its correlation position for the new object distance.

The operation of the apparatus in (1) ascertaining the position of the lens 7 at which correlation now occurs and hence the new focus position to which the lens 1 is to be moved, (2) ascertaining the actual position of the lens 1, and (3) moving the lens 1 to the new focus position will now be described with reference to the operational curve diagram of FIG. 3. The latter shows the changes in certain critical signals and outputs in the apparatus which would typically occur with time as the lens 1 is moved to its new focus position in the illustrative situation.

For the purposes of the present explanation, it is assumed that the repositioning of the lens 1 is completed within four scanning cycles of the lens 7. Accordingly, the time base of the FIG. 3 diagram extends over four scanning cycles. However, the signal curves are shown for only the useful travel portions of those cycles, the curves being interrupted for the return portions of the cycles.

Figure 3:
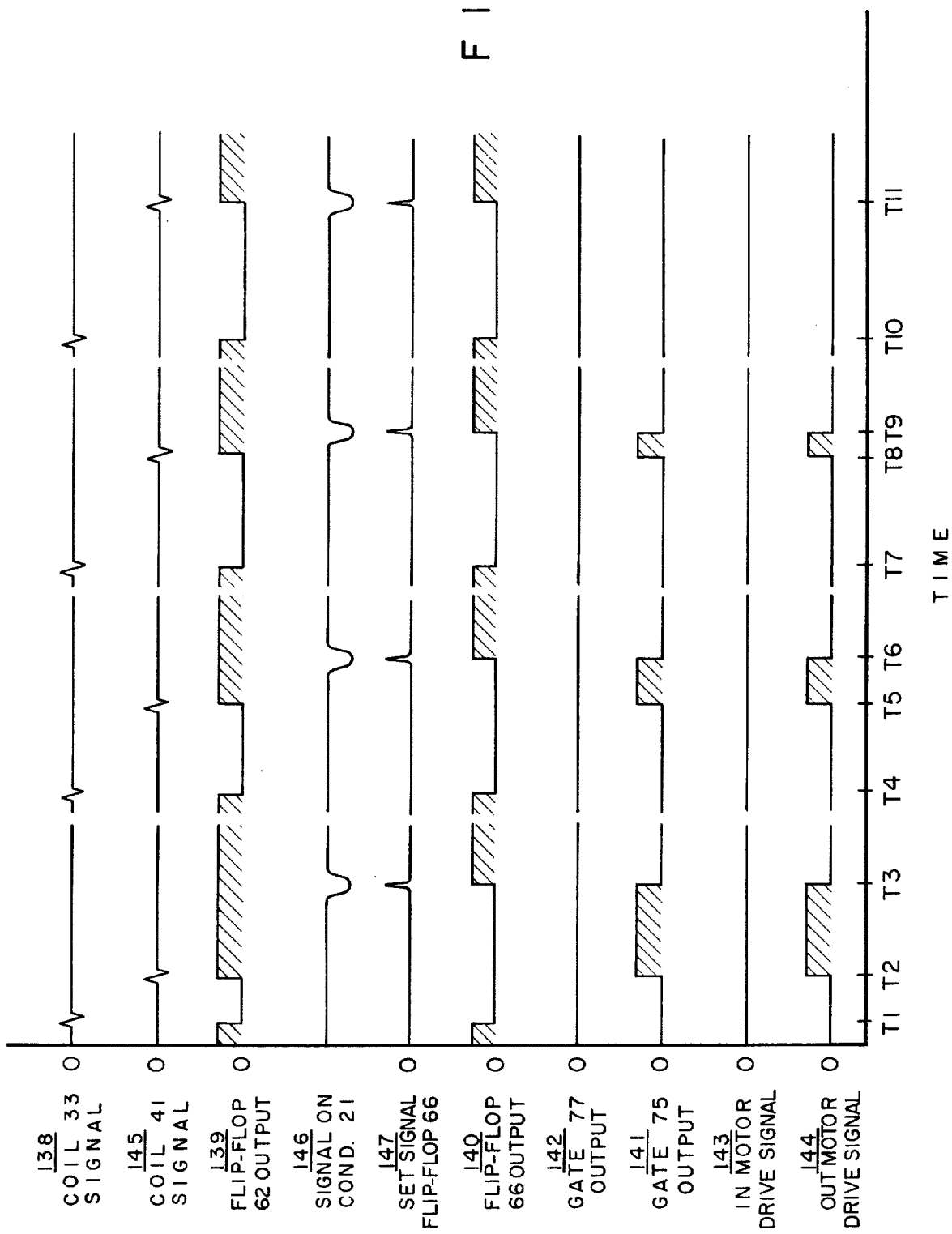
FIGS. 3 and 4 are operational curve diagrams illustrating the operation of the FIG. 1 apparatus for typical situations.

As the lens 7 and the disk 31 start their first scanning cycle following the noted change in the object distance, the magnet 32 passes the reference coil 33 and causes the latter to apply a pulse to the input terminals of the amplifier 48 at the time T1, as shown by the FIG. 3 curve 138. This pulse causes the amplifier 48 to apply a RESET pulse to both of the flip-flops 62 and 66. This, in turn, causes the flip-flops to be reset and to produce a logic 0 in their respective outputs at the time T1, as shown by the respective curves 139 and 140. Since this produces a logic 0 on one of the inputs of each of the AND gates 75 and 77, their outputs are also at logic 0 at this time, as shown by the respective curves 141 and 142. As a result, there is no motor drive signal applied to the motor 34 at this time, as shown by the curves 143 and 144.

As the lens 7 and the disk 31 continue to move, the rotating magnet 32 passes the lens position coil 41. This coil will be only a few degrees counter-clockwise from the infinity focus position shown in FIG. 1, since the lens 1 is presently close to its illustrated infinity focus limit position, due to the previous thirty foot object distance. Thus, it is assumed that the magnet 32 passes the coil 41 at the time T2, at which time the following events occur:

1. The coil 41 applies a pulse to the input terminals of the amplifier 53, as shown by the curve 145;
2. The amplifier 53, in turn, applies a SET pulse to the flip-flop 62;
3. The flip-flop 62 consequently produces a logic 1 in its Q output terminal 74, as shown by the curve 139;
4. This logic 1 appears on the upper input of the AND gate 75. Further, the output of the flip-flop 66 is still at logic 0, and the inverter 79 is thus keeping a logic 1 on the lower input of the gate 75. Since the latter now thus has a logic 1 on each of its inputs, its output rises to a logic 1, as shown by the curve 141. This output appears on the conductor 80 as a positive input signal to the amplifier 83;
5. The amplifier 83 is connected as an inverting amplifier. Consequently, the positive signal on the conductor 80 causes the amplifier 83 to drive the bases of the transistors 97 and 98 negative. This turns on the transistor 98, but not the transistor 97; and
6. The on transistor 98 produces a motor drive signal which makes the terminal 36 of the motor 34 positive, thereby causing the motor 34 to rotate in a counter-clockwise direction and to move the lens 1 out, as shown by the curve 144.

Since, at the time T2, there is no output from the flip-flop 66 or the AND gate 77, there is not output from the amplifier 91, and no motor drive signal to move the lens 1 in is produced, as shown by the respective curves 142 and 143.

The lens 7 continues to move, and the motor 34 continues to move the lens 1 out, until the lens 7 reaches its correlation position for the new object distance. At this time, shown as time T3 in FIG. 3, the signal on the conductor 21 attains a minimum value, as shown by the curve 146. This causes the amplifier 56 to deliver a positive SET pulse to the flip-flop 66, as shown by the curve 147, in the manner now to be described.

Previous to the time T3, the input terminal 55 of the amplifier 56 has not been positive with respect to the terminal 58, and the amplifier output has thus been zero or negative, due to the nature of the signal on the conductor 21 and the action of the capacitor 59. As the signal on the conductor 21 passes through its minimum value and just begins to rise, the terminal 55 becomes positive with respect to the terminal 58. This causes the amplifier output to flip positive, and this in turn causes the RC circuit composed of the capacitor 64 and the resistor 67 to produce the positive SET pulse at the terminal 65 of the flip-flop 66, substantially at the time T3.

The last-mentioned pulse causes the output of the flip-flop 66 to rise to a logic 1, as shown by the curve 140. This causes the inverter 79 to apply a logic 0 to the lower input of the AND gate 75, thereby causing the output of the latter to drop to logic 0, as shown by the curve 141. The AND gate 77 is not affected by the signal from the flip-flop 66 since it already has a logic 0 output because of the logic 1 output of the flip-flop 62. The transistor 98 is now cut off, and the "out" motor drive signal is terminated for the remainder of the first cycle, as shown by the curve 144.

At the start of the second cycle of the movement of the lens 7, the coil 33 produces a signal at the time T4 which resets both of the flip-flops 62 and 66, as shown by the respective curves 138, 139, and 140. Since the motor 34 moved the lens 1 out and rotated the coil 41 in a counter-clockwise direction for the time period T2–T3 during the first cycle, the pulse from the coil 41 occurs later during this second cycle, at a time T5, as shown by the curve 145. In other words, the period T4–T5 is longer than the corresponding period T1–T2. At the time T5, the flip-flop 62 output, the AND gate 75 output, and the out motor drive signal rise, as shown by the respective curves 139, 141, and 144. Accordingly, the motor 34 is again energized to move the lens 1 further toward its new focus position.

The correlation signal minimum and the SET pulse for the flip-flop 66 occur at the same point in this second cycle as they did in the first cycle, as shown by the respective curves 146 and 147, since the correlation position of the lens 7 is unique for the existing object distance. This point is shown as the time T6. At this time, the flip-flop 66 output rises, and the gate 75 output and the motor drive signal are terminated, as shown by the respective 140, 141, and 144. Since the lens 1 was closer to its final position at the start of this second cycle, the motor drive period T5–T6 is shorter than the corresponding period T2–T3 of the first cycle.

At the start of the third cycle of movement of the lens 7, the coil 33 produces a signal at the time T7 which resets both the flip-flops 62 and 66, as shown by the respective curves 138, 139, and 140. Since the motor 34 moved the lens 1 and the coil 41 still closer to their final positions during the period T5–T6 of the second cycle, the coil 41 pulse occurs even later in the third cycle, at a time T8, as shown by the curve 145. Again, the period T7–T8 is longer than the corresponding period T4–T5 of the second cycle. At the time T8, the flip-flop 62 output, the AND gate 75 output, and the out motor drive signal rise, as shown by the respective curves 139, 141, and 144. Accordingly, the motor 34 is again energized to move the lens 1 still further toward its final position.

The correlation signal minimum and the SET pulse for the flip-flop 66 again occur at the same point in this third cycle, as shown by the respective curves 146 and 147. This point is shown as the time T9. At this time, the flip-flop 66 output rises, and the gate 75 output and the motor drive signal are terminated, as shown by the respective curves 140, 141, and 144. Since the lens 1 was almost at its final position at the start of this third cycle, the motor drive period T8–T9 is very short, and is assumed to be sufficient to bring the lens 1 into its final position.

At the start of the fourth cycle of movement of the lens 7, the coil 33 resets the two flip-flops at a time T10 as before, as shown by the curves 139 and 140. Since it is assumed that the lens 1 arrived at its new focus position as a result of the motor drive signal of the period T8–T9, the coil 41 pulse and the correlation signal minimum occur at the same time T11, as shown by the respective curves 145 and 146. As a result, the AND gate 75 produces no output in this cycle, and there is thus no motor drive signal produced, as shown by the respective curves 141 and 144. These conditions of the fourth cycle will prevail throughout the subsequent cycles until the next change in the object distance occurs.

It is noted that the lens 7 will pass through a correlation position during each of its return travel movements toward the right. The resulting minima in the signal on the conductor 21 have no effect on the operation described above, however, since the flip-flop 66 is always already in its SET condition at the time each of such return travel minima occur.

SECOND OPERATING EXAMPLE

For the second of the typical situations described to illustrate the operation of the FIG. 1 apparatus, let it be assumed that the object moves back to its former 30 foot object distance while the lens 1 is in its focus position for the 10 foot object distance. The operation of the apparatus in moving the lens 1 in toward the plane 2, to place it in the focus position for the new 30 foot object distance, will be described with reference to the operational curve diagram of FIG. 4, which is the equivalent of the FIG. 3 diagram for the first illustrative situation.

Figure 4:
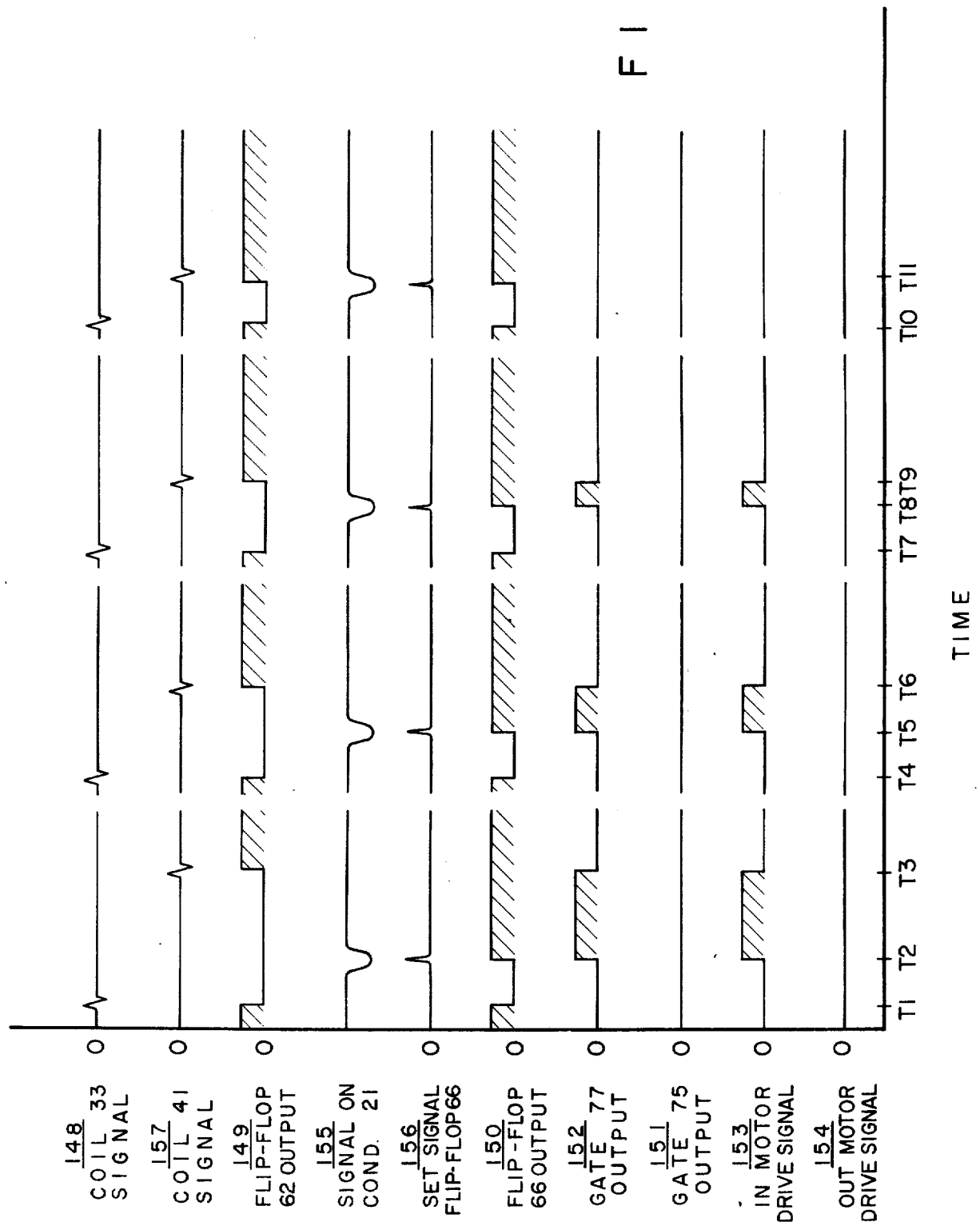

As the lens 7 starts its first scanning cycle illustrated in FIG. 4 following the change in the object distance from 10 feet to 30 feet, the coil 33 signal is produced, and the two flip-flops are reset, at the time T1. This is shown by the respective curves 148, 149, and 150. Consequently, the AND gate outputs and the motor drive signal are zero, as shown by the respective curves 151, 152, 153, and 154.

As the lens 7 continues to move, it reaches its correlation position for the new object distance at the time T2. The correlation position is reached early in this cycle because of the fact that the existing object distance is relatively long. Thus, at the time T2, the following events occur:

1. The correlation signal attains its minimum value and the set pulse for the flip-flop 66 is produced, as shown by the respective curves 155 and 156;
2. The output of the flip-flop 66 consequently rises to a logic 1, as shown by the curve 150;
3. This places a logic 1 on the lower input of the AND gate 77. Since the coil 41 has not as yet been passed by the magnet 32, due to the lens 1 being relatively far out, the output of the flip-flop 62 is still at logic 0, as shown by the curve 149. Accordingly, the inverter 76 is holding a logic 1 on the upper input of the AND gate 77, whereby the output of the flip-flop 66 causes the output of the gate 77 to rise to a logic 1, as shown by the curve 152. This output appears on the conductor 89 as a positive input signal to the amplifier 91;
4. The amplifier 91 is connected as a non-inverting amplifier. Consequently, the positive signal on the conductor 89 causes the amplifier 91 to drive th bases of the transistors 97 and 98 positive. This turns on the transistor 97, but not the transistor 98; and
5. The on transistor 97 produces a motor drive signal which makes the terminal 36 of the motor 34 negative, thereby causing the motor 34 to rotate in a clockwise direction and to move the lens 1 in, as shown by the curve 153.

Since at the time T2 the inputs of the gate 75 are at logic 0, there are no outputs from the gate 75 or the amplifier 83, and no motor drive signal to move the lens 1 out is produced, as shown by the respective curves 151 and 154.

The lens 7 and the disk 31 continue to move, and the motor 34 continues to move the lens 1 in, until the magnet 32 passes the lens position coil 41. This is assumed to occur at the time T3, at which time the following events occur:

1. The coil 41 applies a pulse to the input terminals of the amplifier 53, as shown by the curve 157;
2. The amplifier 53, in turn, applies a SET pulse to the flip-flop 62;
3. The flip-flop 62 consequently produces a logic 1 at is output, as shown by the curve 149;
4. The inverter 76 now applies a logic 0 to the upper input of the gate 77, thereby causing its output to drop to logic 0, as shown by the curve 152;
5. The transistor 97 is now cut off, and the in motor drive signal is terminated for the remainder of this first cycle, as shown by the curve 153.

At the start of the second cycle of the movement of the lens 7, the coil 33 produces a signal at the time T4 which resets both of the flip-flops, as shown by the respective curves 148, 149, and 150. It is believed to be apparent without further explanation that the in motor drive signal is produced at the time T5, and is terminated at the time T6, as shown by the curve 153. Since the lens 1 was closer to its final position at the start of this second cycle, the motor drive period T5–T6 is shorter than the corresponding period T2–T3 of the first cycle.

In the third cycle, the RESET pulse occurs at the time T7, the correlation pulse and SET pulse for the flip-flop 66 occur at the time T8, and the SET pulse for the flip-flop 62 occurs very soon thereafter at the time T9, as shown by the respective curves 148, 156, 150, 157, and 149. The in motor drive signal is thus produced in the short period T8–T9, since the lens 1 is now almost at its final position.

By the start of the fourth cycle shown in FIG. 4, the in motor drive periods of the first three cycles are assumed to have rotated the motor 34 and the magnet 41 sufficiently in the clockwise direction to have placed the magnet 41 and the lens 1 in their new focus positions. As a result, following the time T10 of the fourth cycle RESET pulse, the correlation signal minimum and the coil 41 pulse occur at the same time T11, as shown by the respective curves 155 and 157. Consequently, the AND gate 77 produces no output signal in this cycle, and there is thus no in motor drive signal produced, as shown by the respective curves 152 and 153. These conditions of the fourth cycle will prevail throughout the subsequent cycles of movement of the lens 7 until the next change in the object distance occurs.

It should be appatent from the foregoing description that, if the motor rotation produced during the first three cycles of FIG. 3 or FIG. 4 is not sufficient to bring the lens 1 into its new focus position, the motor 34 will again be supplied with a drive signal in the fourth cycle, and in subsequent cycles if necessary, until the coil 41 is so positioned that it produces its pulse at the same time that the lens 7 attains its correlation position. Similarly, if the motor rotation produced during the first three cycles moves the lens 1 and the coil 41 past their new focus positions, a motor drive signal will be produced in the fourth and subsequent cycles as needed to move the lens 1 and the coil 41 in the opposite direction, back to the overshot correct focus position.

The foregoing explanation shows the manner in which the FIG. 1 apparatus repeatedly ascertains at which of the positions of the moving lens 7 the correlation dip in the processor output signal occurs, repeatedly ascertains the instantaneous position of the lens 1, repeatedly compares these two ascertained positions, and moves the lens 1 to make these two positions correspond, thereby bringing the lens 1 into focus position for the existing object distance.

If it should be desired to so arrange the FIG. 1 apparatus that the disk 40 and the magnet 41 rotate through 360° for movement of the lens 1 from its infinity focus limit position to its close focus limit position, this can be done by making the cam 25 an involute cam. With this construction, the lens 7 would move progressively toward the left in each cycle for substantially 360° of rotation of the shaft 24 and the disk 31, and would then rapidly return to its right-hand limit position at the end of each such travel toward the left.

THE APPARATUS OF FIG. 5

Figure 5:
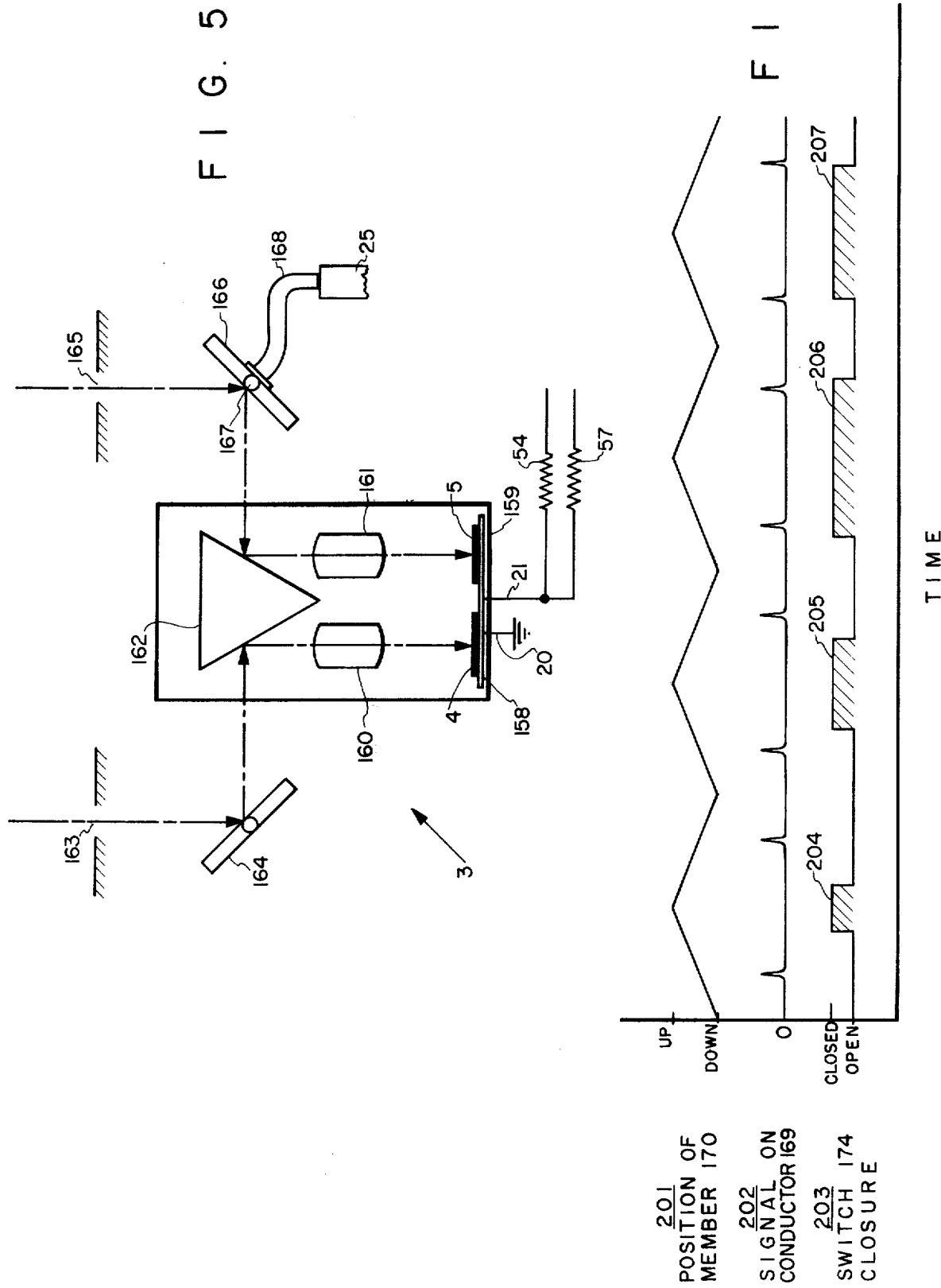
FIG. 5 is a diagrammatic representation of a portion of the FIG. 1 apparatus illustrating a modified form of that portion.

FIG. 5 shows a modified form of a portion of the FIG. 1 apparatus wherein the detection image forming and receiving portions are in the modular form which is disclosed in FIG. 15 of the said Stauffer application. Accordingly, in FIG. 5, the light responsive detector arrays 4 and 5 are shown as being portions of an integrated circuit chip 158, which may well be of the type disclosed in the said Stauffer application. The chip 158 is considered also to include the amplifiers and other elements and connections of the signal processor 8. Thus, the output connections 20 and 21 come from the chip 158, and are to be considered as being connected to the remainder of the FIG. 1 apparatus in the same manner as that illustrated in FIG. 1.

It is noted that, if desired, the chip 158 can be used with the lenses 6 and 7 in the FIG. 1 apparatus instead of the discrete arrays 4 and 5.

The chip 158 is included in a module 159 which also includes a lens 160, a lens 161, and a reflecting prism or mirror 162. An aperture 163 and a fixed mirror 164 cooperate with the prism 162 and the lens 160 to form the above-described first auxiliary or detection image on the array 4. An aperture 165 and a movable scanning mirror 166 cooperate with the prism 162 and the lens 161 to form the above-described second auxiliary or detection image on the array 5. The paths over which the light passes in forming the two detection images are shown by the dash-dot centerlines in FIG. 5.

The mirror 166 is pivoted at 167, and is provided with a lever 168 having a lower end which is maintained in contact with the periphery of the FIG. 1 cam 25. Accordingly, as the cam 25 rotates continuously as explained in connection with FIG. 1, the mirror 166 is continuously rotated back and forth about the pivot point 167 between its travel limit positions. This action causes the image produced on the array 5 to move back and forth over the array 5 just as this image is moved by the motion of the lens 7 in the FIG. 1 apparatus.

Accordingly, the operation of the FIG. 1 apparatus when modified as shown in FIG. 5 is the same as that described above for the FIG. 1 apparatus. Thus, during the first 180° of travel of the cam 25 in each scanning cycle, the mirror 166 progressively moves the image on the array 5 toward the left from its right-hand travel limit to its left-hand travel limit. During this travel, the mirror 166 passes through a correlation position at which the signal between the conductors 20 and 21 dips to its minimum value. The occurrence of this signal minimum identifies this position of the mirror 166 as the correlation position for the existing object distance, all as in the case of the FIG. 1 apparatus.

THE APPARATUS OF FIG. 6

Figure 6:
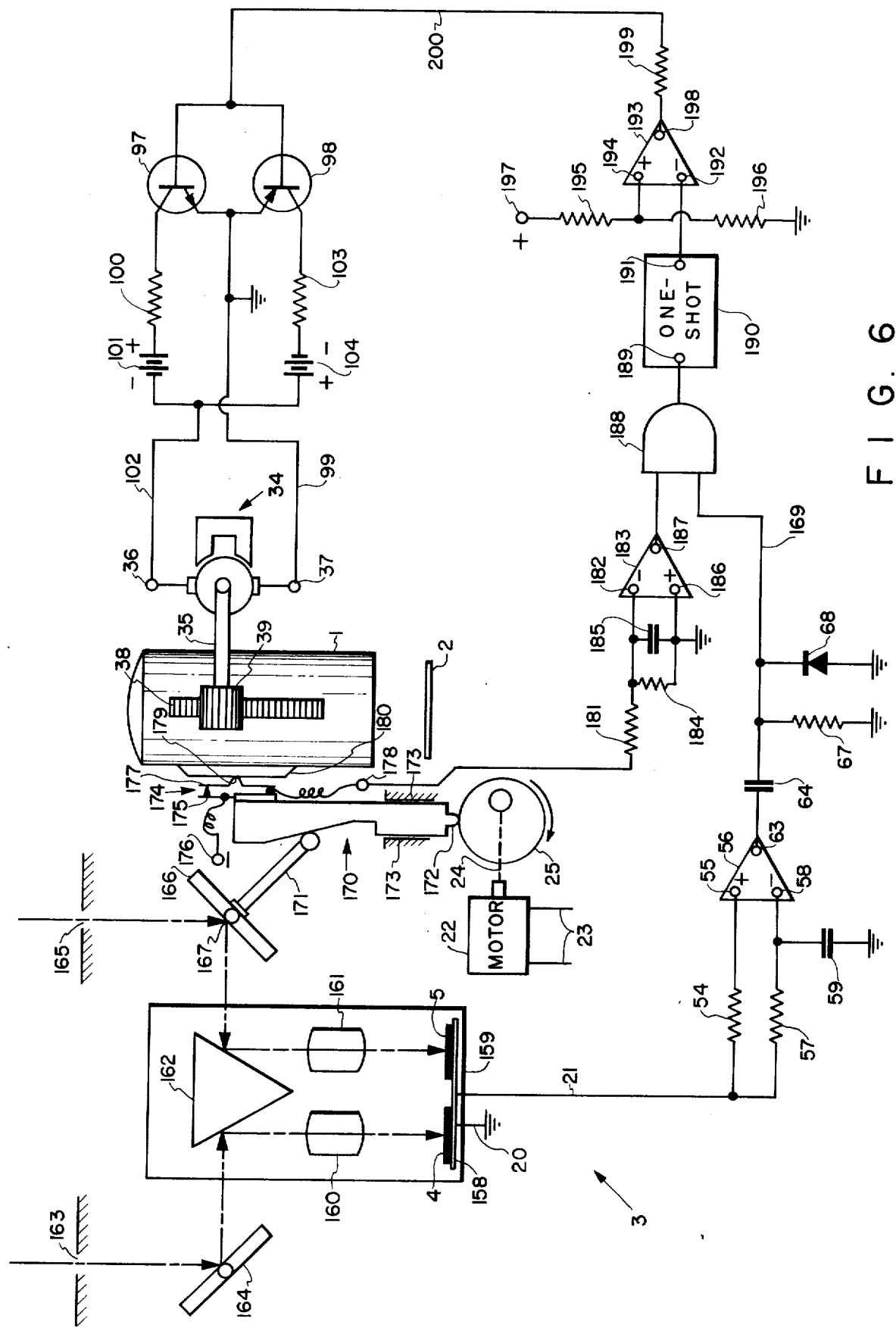
FIG. 6 is a diagrammatic representation of a modified form of the FIG. 1 apparatus.

FIG. 6 shows a modified form of the FIG. 1 apparatus which employs the module and mirror combination of FIG. 5 with an arrangement for ascertaining the mirror correlation and primary lens positions which is different from that included in the FIG. 1 apparatus. Elements which are common to both the FIG. 6 and FIG. 1 arrangements are identified by the same reference numerals in both figures. This applies also to the arrangements of FIGS. 8 and 9.

Considering first the portions of the FIG. 6 apparatus which are present also in the original apparatus, it is noted that the FIG. 6 apparatus includes the module 159 containing the chip 158, and also includes the mirrors 164 and 166, the motor 22 for continuously rotating the cam 25, and the transistor circuit including the transistors 97 and 98 for driving the motor 34 which positions the primary lens 1 with respect to the plane 2. The FIG. 6 apparatus also includes the change of slope detector components 54, 56, 57, 59, 64, 67, and 68 which are connected to the output conductors 20 and 21 of the chip 158 so as to provide on a conductor 169 the correlation signal which provides a positive pulse each time that the mirror 166 passes through its correlation position.

In the FIG. 6 apparatus, the mirror 166 is reciprocally rotated by the cam 25 through the medium of a member 170 and a mirror arm 171. Specifically, the member 170 has a lower portion 172 which is maintained in contact with the periphery of the cam 25 so that the rotation of the latter causes the member 170 to move alternately up and down within guideways 173. The arm 171 is attached at its upper end to the back of the mirror 166 at the pivot point 167, and the lower end of the arm 171 is maintained in engagement with a ramp portion of the member 170. This construction is such that rotation of the cam 25 in a clockwise direction through its first 180° of travel moves the member 170 upward from its lower to its upper limit of travel. This motion, in turn, rotates the mirror 166 in a counter-clockwise direction, and moves the image on the array 5, from one travel limit to the other. This is the useful travel portion of the movement cycle of the cam 25, the member 170, and the mirror 166.

The remaining 180° of rotation of the cam 25 move the member 170 down to its lower travel limit, and rotate the mirror 166 through its return travel portion of its scanning cycle. Thereafter, the mirror 166 is again rotated through its useful range of travel. In the particular position occupied by the parts as shown in FIG. 6, the member 170 and the mirror 166 have been moved through about one-half of their useful travel.

A switch 174 is carried and reciprocated by the upper portion of the member 170. The switch 174 has a fixed contact 175 which is connected to the negative terminal 176 of a source of power, not shown. The other terminal of the latter is connected to ground. The switch 174 also has a movable contact 177 which is connected to a terminal 178. The contact 177 has a projection 179 which cooperates with a projection 180 on the holder or casing of the lens 1. This construction is such that the contacts of the switch 174 are closed for a portion of each cycle of the movement of the member 170, the length of this portion being greatest when the lens 1 is in at its infinity focus limit position, and being the least when the lens 1 is out at its close focus limit position.

It is noted that, if desired, the positions of the switch 174 and the projection 180 can be reversed, so that the lens 1 carries the switch 174, and the member 170 carries the projection 180.

The switch terminal 178 is connected through a resistor 181 to the inverting input terminal 182 of an operational amplifier 183. A resistor 184 and a capacitor 185 are connected between the terminal 182 and ground as a contact bounce filter. The non-inverting input terminal 186 of the amplifier 183 is connected to ground.

The output terminal 187 of the amplifier 183 is connected to one input of an AND gate 188, the other input of which is connected to the conductor 169 on which the correlation signal pulse appears. The output of the gate 188 is connected to the trigger terminal 189 of a one-shot 190. The latter is made to have a duration of approximately 80 percent of the time required for the member 170 to complete a full cycle of motion. Thus, the output terminal 191 of the one-shot 190 is normally at logic 0, but a logic 1 pulse applied to the terminal 189 causes the output terminal to rise to a logic 1 for the noted 80 percent period.

The one-shot output terminal 191 is connected to the inverting input terminal 192 of an operational amplifier 193. The non-inverting input terminal 194 of the amplifier 193 is connected to the junction between two resistors 195 and 196 which are connected in series between the positive terminal 197 and the grounded negative terminal of a source of power, not shown. The output terminal 198 of the amplifier 193 is connected through a resistor 199 to a conductor 200 which, in turn, is connected to the bases of the transistors 97 and 98. The latter are connected to the terminals 36 and 37 of the lens 1 motor 34 by way of the resistors 100 and 103, the power sources 101 and 104, and the conductors 99 and 102 as in the FIG. 1 apparatus.

The construction of the FIG. 6 apparatus is such that, when the output of the one-shot 190 is logic 0, a positive signal appears on the conductor 200 which turns on only the transistor 97. This causes the motor 34 to rotate in a clockwise direction and to move the lens 1 in. When the output of the one-shot 190 is logic 1, a negative signal appears on the conductor 200 which turns on only the transistor 98. This causes the motor 34 to rotate in a counter-clockwise direction and to move the lens 1 out. Thus, the lens 1 is always being moved either in (no one-shot output) or out (one-shot output at logic 1).

OPERATION OF THE FIG. 6 APPARATUS

The operation of the FIG. 6 apparatus will be explained with reference to the curves of the operational curve diagram of FIG. 7. These curves show the changes which occur with time in regard to several items of the apparatus for a typical situation which illustrates the apparatus operation.

For the operating example illustrated by FIG. 7, it is assumed that the object distance has just become relatively large, say 30 feet, and that the lens 1 is out at its focus position for a short object distance of about 5 feet. Accordingly, the lens 1 must now be moved in to be at its focus position for the new thirty foot object distance.

The continuous up and down motion of the member 170, and hence the corresponding back and forth rotation of the mirror 166, are shown for four complete cycles by the curve 201. For each cycle, there are two correlation positions of the mirror 166, and hence two pulses produced on the conductor 169, as shown by the curve 202. The wide space between the two pulses of each cycle is indicative of the assumed 30 foot object distance.

As the member 170 moves through the first illustrated cycle, the contact 177 of the switch 174 is moved into and out of engagement with the contact 175. Since the lens 1 is out at the assumed 5 foot focus position, this switch closure occurs while the member 170 is in the vicinity of its upper travel limit. As a result, the time period 204 during which the switch 174 is closed is relatively short. These conditions are shown by the curve 203.

As long as the switch 174 is closed, a logic 1 is applied to the upper input of the AND gate 188. As is shown by the curves 202 and 203, no such signal is present on the AND gate 188 in the first cycle at the times at which the correlation pulses are produced on the conductor 169 and on the lower input of the AND gate 188. Consequently, there is no output from the AND gate 188, and thus no output from the one-shot 190, during the first cycle. Accordingly, throughout the first cycle, there is a positive signal on the conductor 200, and the motor 34 moves the lens 1 in toward its correct focus position.

In the second cycle shown in FIG. 7, the switch 174 remains closed for a longer period 205, as shown by the curve 203. This occurs because the motor 34 is progressively moving the lens 1 in or down, as explained above. This movement of the lens 1 continues during the second cycle, since again the pulses on the lower input of the AND gate 188 do not occur while the switch 174 is closed, whereby the one-shot 190 is again not triggered.

By the third cycle, the motor 34 is assumed to have moved the lens 1 so far in that the latter has just passed the correct focus position. In other words, the lens 1 is now slightly too far in. The switch 174 is now closed for the period 206 shown by the curve 203, which period starts before the first correlation pulse is produced, and is still present at the time that the second correlation pulse is produced. Consequently, the AND gate 188 triggers the one-shot 190 in the third cycle.

As soon as the one-shot 190 is triggered, the positive signal on the conductor 200 is changed to a negative signal. This causes the motor 34 to reverse its direction of rotation and to start moving the lens 1 out.

By the fourth cycle, it is assumed that the lens 1 has been moved out to its correct focus position, which is characterized by making the closed period 207 of the switch 174 lie just within the period between correlation pulses. Accordingly, the one-shot 190 is not triggered in this fourth cycle, and the outward movement of the lens 1 is terminated. Thereafter, the motor 34 will be alternately energized to move the lens 1 alternately slightly in and out about its correct focus position, thereby effectively maintaining the lens 1 in that position.

If now the object distance becomes shorter, say five feet, the correlation pulses for each cycle will be produced close together at the middle of the cycle. Accordingly, these pulses will occur during the switch closed period 207 which corresponds to the present thirty foot focus position of the lens 1. Consequently, the one-shot 190 will be triggered repeatedly until the resulting outward movement of the lens 1 reduces the switch closed period to that shown at 204. Thereafter the alternate energization of the motor 34 for rotation in opposite directions will keep the lens 1 in the proper focus position for the new 5 foot object distance.

THE APPARATUS OF FIG. 8

Figure 8:
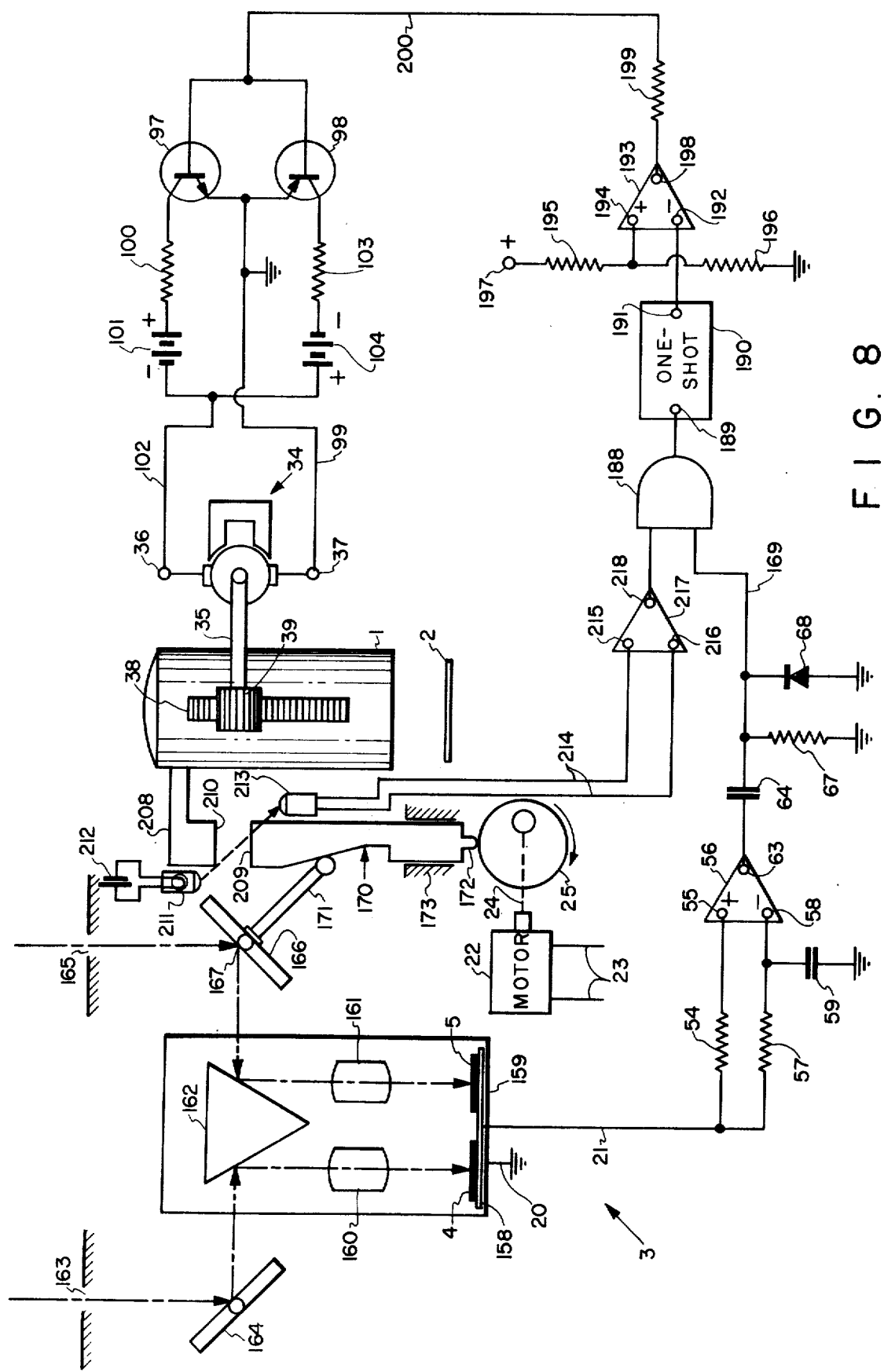
FIGS. 8 and 9 are diagrammatic representations of other modified forms of the FIG. 1 apparatus.

FIG. 8 shows a modified form of the FIG. 6 apparatus which employs a radiation switch instead of the mechanical switch 174 of the FIG. 6 apparatus. Otherwise, the FIG. 6 and FIG. 8 arrangements are the same.

In FIG. 8, an opaque member 208 is attached to the casing of the lens 1. The member 208 is so located that the upper edge 209 of the member 170 crosses or passes over the lower edge 210 of the member 208 as the member 170 rises during its cycle of movement. A light source 211, powered by a suitable source such as a battery 212, is located to the left of the path of movement of the member 170. A light sensor 213 is located to the right of that path of movement. This construction is such that the sensor 213 receives light from the source 211 unless the edge 209 has passed over the edge 210. In other words, the sensor 213 receives light from the source 211 only as long as there is a space between the edges 209 and 210. Thus, as the member 170 starts upward from its lower limit position in each cycle, the sensor 213 receives light until the edge 209 crosses the edge 210. This occurs at a time in the cycle which is dependent upon the existing position of the lens 1. Thereafter, the sensor 213 does not receive light again until the member 170 has moved down to the position in which the edge 209 just uncovers the edge 210.

As a result of the foregoing described construction, the sensor 213 receives no light for a portion of each cycle of movement of the member 170, the length of this portion being the greatest when the lens 1 is in at its infinity focus limit position, and being the least when the lens 1 is out at its close focus limit position.

The output of the sensor 213 is connected by conductors 214 to the input terminals 215 and 216 of an operational amplifier 217. The output terminal 218 of the latter is connected to the upper input of the AND gate 188, in place of the FIG. 6 switch amplifier output terminal 187. This construction is such that a logic 1 is applied to the upper input of the gate 188 from the terminal 218 for each period in which the sensor 213 is not receiving light. Therefore, the logic 1 appearing on the upper input of the gate 188 is identical to that produced by the closed condition of the switch 174 in the FIG. 6 apparatus.

It is seen from the foregoing that the FIG. 8 elements including the members 170 and 208, the light source 211, and the sensor 213 cooperate to provide a measure of the relative positions of the mirror 166 and the lens 1 as does the switch 174 of the FIG. 6 apparatus. Thus, the over-all operation of the FIG. 8 apparatus is the same as that described above for the FIG. 6 apparatus.

THE APPARATUS OF FIG. 9

Figure 9:
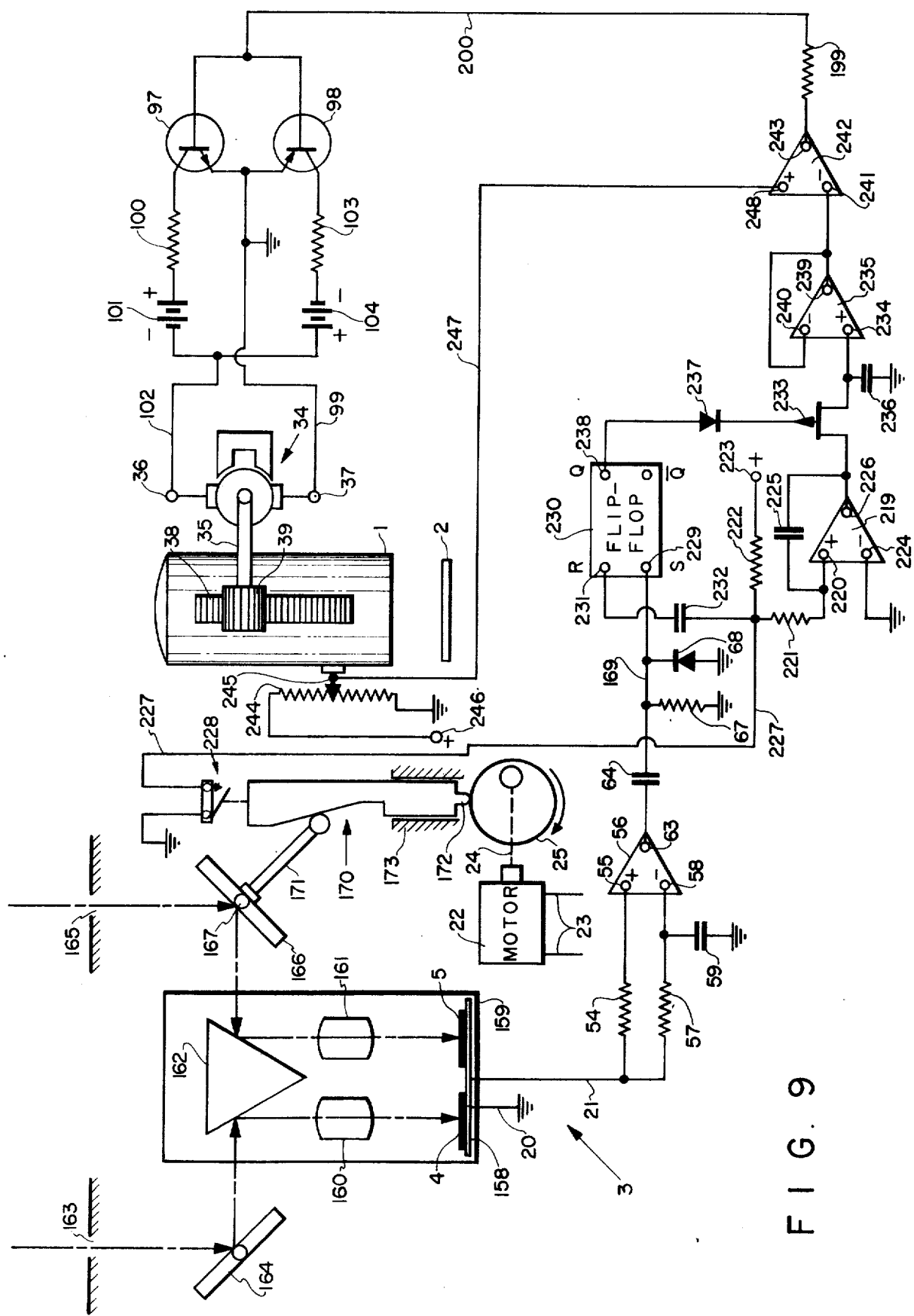

FIG. 9 shows a modified form of the FIG. 6 apparatus which employs still a different arrangement for ascertaining and comparing the correlation position of the mirror 166 with the existing position of the lens 1. The FIG. 9 apparatus includes the module 159 and associated components, the reciprocating member 170, the transistor circuit including the transistors 97 and 98 for driving the motor 34 for the lens 1, and the change of slope detecting circuit including the amplifier 56.

As a means for providing a measure of the correlation positions of the mirror 166, the FIG. 9 apparatus includes a ramp signal generating arrangement which produces a signal of a magnitude proportional to the positions of the member 170 and the mirror 166 in their useful travel portions of their cycles of movement. This arrangement includes an operational amplifier 219 arranged as an integrator. Specifically, the non-inverting input terminal 220 of the amplifier 219 is connected through resistors 221 and 222 to the positive terminal 223 of a source of power, not shown, which has its other terminal connected to ground. The inverting input terminal 224 of the amplifier 219 is also connected to ground. An integrating capacitor 225 is connected between the output terminal 226 of the amplifier 219 and the non-inverting input terminal 220.

The junction between the resistors 221 and 222 is connected by a conductor 227 and a switch 228 to ground. The switch 228 is so coupled to the member 170 that the switch is opened each time that the member 170 starts upward from its lower travel position, and is closed for the return travel of the member 170. In other words, the switch 228 is open only for the useful travel portion of each cycle of movement of the member 170 and the mirror 166. When the switch 228 is open, the signal at the output terminal 226 rises linearly with time. When the switch 228 is closed, the voltage at the terminal 226 drops to zero.

The SET terminal 229 of an RS flip-flop 230 is connected to the conductor 169, on which the correlation signal pulses are produced. The RESET terminal 231 of the flip-flop 230 is connected through a capacitor 232 to the above-noted junction to which the switch 228 is connected. As a result, the flip-flop 230 is set by a pulse on the conductor 169, and is reset each time that the switch 228 is opened.

The output terminal 226 of the amplifier 219 is connected through an FET switch 233 to the non-inverting input terminal 234 of an operational amplifier 235. A capacitor 236 is connected between the terminala 234 and ground. The gate of the FET 233 is connected through a diode 237 to the Q output terminal 238 of the flip-flop 230. This construction is such that, when the flip-flop 230 is reset and the output terminal 238 is at logic 0, the FET 233 is on, and the signal at the input terminal 234 rises as the signal at the output terminal 226 rises. When a correlation pulse sets the flip-flop 230, the FET 233 turns off, and the capacitor 236 holds the signal on the terminal 234 to the value it has at the time of the occurrence of the correlation pulse and the setting of the flip-flop 230.

The amplifier 235 is connected as a voltage follower or isolating amplifier to prevent the unwanted discharge of the capacitor 236. Specifically, the output terminal 239 of the amplifier 235 is connected to the inverting input terminal 240 of the amplifier.

The amplifier output terminal 239 is also connected to the inverting input terminal 241 of an operational amplifier 242, the output terminal 243 of the latter is connected through the resistor 199 and the conductor 200 to the motor drive transistors 97 and 98.

The FIG. 9 apparatus also includes an adjustable resistor for providing a measure of the existing position of the lens 1. The body 244 of this resistor is positioned alongside the path of travel of the lens 1, and is engaged by a sliding contact 245 carried by the casing of the lens 1. The resistor body 244 is connected between ground and the positive terminal 246 of a power source, not shown, which has its other terminal connected to ground. The contact 245 is connected by a conductor 247 to a non-inverting input terminal 248 of the amplifier 242. As a result, the signal at the terminal 248 is a measure of the existing position of the lens 1.

OPERATION OF THE FIG. 9 APPARATUS

The operation of the FIG. 9 apparatus will now be explained by considering a typical illustrative situation. Let is be assumed that the object distance has just become relatively large, say 30 feet, and that the lens 1 is out at its focus position for a short object distance of about 5 feet. Accordingly, the lens 1 must not be moved in to be at its focus position for the new 30 foot object distance.

Just before the start of the first cycle of operation of the member 170 and the mirror 166 following the noted change in object distance, the switch 228 is being held closed by the member 170. The output of the flip-flop 230 is at logic 1, the FET 233 is off, the capacitor 236 is holding the signal on the input terminal 241 of the amplifier 242 at a value representative of the position occupied by the mirror 166 at the time of the last useful correlation pulse in the signal on the conductor 169. The signal on the terminal 241 is thus a mirror position signal. Due to the switch 228 being closed, the output signal of the integrator on the output terminal 226 is substantially zero at this time.

As the member 170 starts its upward movement in this first cycle being considered, it first opens the switch 228. This causes the signal on the output terminal 226 to start to rise progressively with time, and hence with the progressive movement of the mirror 166. THe opening of the switch 228 also causes the capacitor 232 to apply a RESET pulse to the terminal 231 of the flip-flop 230. The resulting drop of the flip-flop output to logic O at the terminal 238 turns on the FET 233, thereby essentially connecting the capacitor 236 and the input terminal 241 of the amplifier 242 to the integrator output terminal 226. Consequently, the mirror position signal at the terminal 241 drops to zero and then starts to rise progressively, representing the progressive movement of the mirror 166.

The movement of the mirror 166 brings it into its correlation position soon after the start of the cycle, due to the object distance being the assumed 30 feet. At that time, the correlation pulse is produced at the flip-flop terminal 229, setting the latter and raising its output at the terminal 238 to a logic 1. This turns off the FET 233. As a result, at the time at which the mirror 166 reaches its correlation position, the capacitor 236 and the terminal 241 are effectively disconnected from the output terminal 226. This leaves the signal on the capacitor 236 and the terminal 241, for the remainder of the cycle, at the value represesnting the position of the mirror 166 at the time of correlation, and hence at the value representing the new 30 foot object distance.

At the above-noted time in the first cycle at which the correlation pulse freezes the value of the mirror position signal on the input terminal 241, the lens 1 resistor contact 245 is supplying a lens position signal to the other input terminal 248 of the amplifier 242. This lens position signal is considerably more positive than the mirror position signal held on the terminal 241. This is so because the assumed five foot focus position of the lens 1 places the contact 245 toward the upper end of the resistor body 244, whereas the assume 30 foot object distance makes the correlation pulse occur relatively early in the cycle and hence makes the held mirror position signal relatively small.

The amplifier 242 compares the signals present on the two input terminal 248 and 241. Since the non-inverting terminal 248 is more positive than the inverting terminal 241, the amplifier 242 applies a positive signal over the conductor 200 to the bases of the transistors 97 and 98. As previously noted in regard to the FIG. 6 apparatus, a positive signal on the conductor 200 turns on only the transistor 97, which in turn drives the motor 34 in a clockwise direction and causes the lens 1 to move in. This motion continues for the remainder of the cycle.

The above-described action is repeated in subsequent cycles until the in motion of the lens 1 has reduced the value of the lens position signal on the terminal 248 to the value of the mirror position signal held on the terminal 241. When this occurs, no signal is applied to the conductor 200, and the motor 34 leaves the lens 1 at rest in a new position. The apparatus is so calibrated that this new position is the focus position for the existing 30 foot object distance.

If now the object distance becomes shorter, say 5 feet, the mirror position signal placed and held on the terminal 241 becomes relatively large. Since the lens 1 is presently at its 30 foot focus position, the lens position signal on the terminal 248 is relatively small, and is thus considerably less than the mirror position signal. Under this condition, the amplifier 242 places a negative signal on the conductor 200. As previously noted in regard to the FIG. 6 apparatus, a negative signal on the conductor 200 turns on only the transistor 98, which in turn drives the motor 34 in a counter-clockwise direction. This causes the lens 1 to be moved out toward its 5 foot focus position. This action continues for subsequent cycles until the outward movement of the lens 1 has so increased the lens position signal on the terminal 248 that this signal is substantially equal to the mirror position signal held on the terminal 241. When this occurs, no signal is applied to the conductor 200, and the motor 34 again leaves the lens 1 at the proper focus position for the new object distance.

It is noted in connection with the arrangements of FIGS. 6, 8 and 9 that the lens 1 can, if desired, be moved by a mechanism which is different from the illustrated rack and pinion mechanism. For example, the lens 1 could be positioned by a drive screw arrangement. Also is desired, any of the several position ascertaining and comparing arrangements of FIGS. 6, 8, and 9 can be used in the FIG. 1, or auxiliary lens, type of apparatus in place of the illustrated magnetic pulse type of position ascertaining and comparing arrangement. It is noted also that the chip 158 can be made to include as much of the illustrated logic and motor drive circuitry of the arrangements of FIGS. 1, 6, 8, and 9 as desired. Thus, for example, the chip 158 may desirably be fabricated to include the illustrated cicuitry which includes the operational amplifiers, the flip-flops, the gates, the transistors, etc.

CONCLUSION

It is believed to be clear from the foregoing description that the described automatic focusing apparatus according to the present invention fulfills the objects stated herein. Thus, it has been shown that said apparatus (a) rapidly ascertains the distance to an object by moving an auxiliary optical element in a scanning cycle without requiring that the lens to be focused move along with the auxiliary elements, and (b) separately rapidly moves said lens to its focus position corresponding to the ascertained object distance. The rapid repeating of the scanning cycle gives the desired result of maintaining the lens in a focused condition despite rapid changes in the object distance, as is essential when the lens is the taking lens of a motion picture camera. Moreover, the disclosed apparatus provides such focus following operation without undue complexity, without requiring that the lens be repeatedly returned to a datum position, and without the need for the special switching arrangements required by the apparatus of the noted Stauffer patents.

The embodiments of the invention in which an exclusive property or privilege is claimed are defined as follows:

1. Apparatus for providing a measure of the distance between the apparatus and an object, comprising
   a plurality of radiation responsive elements divided into two similar detector arrays, each of said elements being arranged to provide an electrical signal representative of the intensity of radiation impinging thereon,
   first auxiliary optical means defining a first optical path for radiation from the object and for forming a first detection image thereof on solely one of said arrays,
   second auxiliary optical means defining a second optical path for radiation from the object and for forming a second detection image thereof on solely the other of said arrays, the positions and radiation distributions of said detection images on the corresponding arrays changing with changes in the relative positions of said auxiliary means and said arrays, and with changes in the object distance, there being for each such distance a one of the last-mentioned positions at which there is best correspondence of said distribution on said arrays,
   scanning means for relatively moving at least a portion of at least one of said auxiliary means and the corresponding one of said arrays progressively through a predetermined range of relative positions during each of continuously repeated time periods, said range including said one position at which there is said best correspondence of said distributions on said arrays for the existing object distance,
   signal processing means connected to said elements for comparing the signal from each of said elements of one of said arrays with the signal from the positionally corresponding one of said elements of the other of said arrays, and for summing the results of such comparisons to provide an output signal which exhibits a predetermined effect when said best correspondence of said distributions on said arrays is obtained during each of said periods, and
   responsive means coupled to said signal processing means and said scanning means, and responsive to said effect and to said relative moving of said auxiliary means and said arrays to provide a measure of the relative position of said auxiliary means and said arrays at which said effect is produced during each of said periods, the last-mentioned measure being a measure of said object distance.

2. Apparatus as specified in claim 1, wherein said scanning means include means coupled to at least a portion of one of said auxiliary means for moving said portion relative to the corresponding one of said arrays to provide said relative movement and range of relative positions.

3. Apparatus as specified in claim 1, wherein each of said auxiliary optical means includes a mirror, and wherein said scanning means include means coupled to one of said mirrors for moving the latter relative to the corresponding one of said arrays to provide said relative movement and range of relative positions.

4. Apparatus as specified in claim 1, wherein said responsive means include means for determining the time interval between the start of each of said periods and the occurrence of said effect in said output signal in that period as a measure of said object distance.

5. Automatic focusing apparatus, comprising
   primary optical means arranged for producing a primary image of an object on an image plane and capable of adjustment into that position in which said image is in best focus on said plane for the existing object distance,
   a plurality of radiation responsive elements divided into two similar detector arrays, each of said elements being arranged to provide an electrical signal representative of the intensity of radiation impinging thereon,
   first auxiliary optical means defining a first optical path for radiation from the object and for forming a first detection image thereof on solely one of said arrays,
   second auxiliary optical means defining a second optical path for radiation from the object and for forming a second detection image thereof on solely the other of said arrays, the positions and radiation distributions of said detection images on the corresponding arrays changing with changes in the relative positions of said auxiliary means and said arrays, and with changes in the object distance, there being for each such distance a one of the last-mentioned positions at which there is best correspondence of said distributions on said arrays.
   scanning means for relatively moving at least a portion of at least one of said auxiliary means and the corresponding one of said arrays progressively through a predetermined range of relative positions during each of continuously repeated time periods, said range including said one position at which there is said best correspondence of said distributions on said arrays for the existing object distance,
   signal processing means connected to said elements for comparing the signal from each of said elements of one of said arrays with the signal from the positionally corresponding one of said elements of the other of said arrays, and for summing the results of such comparisons to provide an output signal which exhibits a predetermined effect when said best correspondence of said distributions on said arrays is obtained during each of said periods, and
   responsive means coupled to said signal processing means, said scanning means, and said primary optical means, and responsive to said effect and to said relative moving of said auxiliary means and said arrays to effectively ascertain at which of said relative positions in said range said effect is produced during each of said periods, and to adjust said primary optical means into a position corresponding to said ascertained position, this adjusted position of said primary optical means being that in which said primary image is in best focus on said plane.

6. Apparatus as specified in claim 5, wherein one of said auxiliary means includes a movable optical element, and wherein said scanning means include means coupled to said optical element for moving the latter relative to the corresponding one of said arrays to provide said relative movement and range of relative positions.

7. Apparatus as specified in claim 6, wherein said responsive means include first means for determining the time interval between the start of each of said periods and the occurrence of said effect in said output signal in that period, second means for producing a second effect at a time after the start of each of said periods dependent upon the position of said primary optical means relative to said plane at the time of the production of said second effect in that period, third means for determining the time interval between the start of each of said periods and the production of said second effect in that period, said two time intervals in any one of said periods being substantially equal when said primary optical means occupies said adjusted position in which said primary image is in best focus on said plane, motor means coupled to said primary optical means for moving the latter when said motor means is energized, and fourth means for comparing said two time intervals in each of said periods and for energizing said motor means until the time interval determined by said third means is substantially equal to the time interval determined by said first means in the given one of said periods.

8. Apparatus as specified in claim 6, wherein said responsive means include first means for providing an optical element signal which rises progressively in value from a datum value during each of said periods as said optical element is moved progressively through said range of positions, and for holding the value which said optical element signal has reached at the time of the occurrence of said effect in said output signal in that period, second means for providing a primary optical means signal of a value dependent upon the instantaneous position of said primary optical means relative to said plane, the last-mentioned value achieving a predetermined relationship with said held value of said optical element signal when said primary optical means occupies said adjusted position in which said primary image is in best focus on said plane, motor means coupled to said primary optical means for moving the latter when said motor means is energized, and comparing means connected to compare the value of said primary optical means signal with said held value of said optical element signal, and to energize said motor means until said predetermined relationship is established.

9. Apparatus for providing a measure of the distance between the apparatus and an object, comprising a plurality of radiation responsive elements divided into two similar detector arrays, each of said elements being arranged to provide an electrical signal representative of the intensity of radiation impinging thereon, first auxiliary optical means defining a first optical path for radiation from the object and for forming a first detection image thereof on solely one of said arrays, second auxiliary optical means defining a second optical path for radiation form the object and for forming a second detection image thereof on solely the other of said arrays, the positions and radiation distributions of said detection images on the corresponding arrays changing with changes in the relative positions of said auxiliary means and said arrays, and with changes in the object distance, there being for each such distance a one of the last-mentioned positions at which there is best correspondence of said distributions on said arrays, scanning means for relatively moving at least a portion of at least one of said auxiliary means and the corresponding one of said arrays progressively through a predetermined range of relative positions during a time period, said range including said one position at which there is said best correspondence of said distributions on said arrays for the existing object distance, signal processing means connected to said elements for comparing the signal from each of said elements of one of said arrays with the signal from the positionally corresponding one of said elements of the other of said arrays, and for summing the results of such comparisons to provide an output signal which exhibits a predetermined effect when said best correspondence of said distributions on said arrays is obtained during said period, and responsive means including first means coupled to said signal processing means and said scanning means and responsive to said effect and to said relative movement of said auxiliary means and said arrays to effectively ascertain at which of said relative positions in said range said effect is produced during said period, and including a movable member and servo means coupled to said member and to said first means to adjust said member into a position corresponding to said ascertained position, the adjusted position of said member being a measure of said object distance.

10. Apparatus as specified in claim 9, wherein said scanning means include means coupled to at least a portion of one of said auxiliary means for moving said portion relative to the corresponding one of said arrays to provide said relative movement and range of relative positions.

11. Apparatus as specified in claim 9, wherein each of said auxiliary optical means include a mirror, and wherein said scanning means include means coupled to one of said mirrors for moving the latter relative to the corresponding one of said arrays to provide said relative movement and range of relative positions.

12. Apparatus as specified in claim 9, wherein said responsive means include means for determining the time interval between the start of said period and the occurrence of said effect in said output signal in said period as a measure of said object distance.

13. Apparatus for automatically focusing the image of an object, comprising a plurality of radiation responsive elements divided into two similar detector arrays, each of said elements being arranged to provide an electrical signal representative of the intensity of radiation impinging thereon, first auxiliary optical means defining a first optical path for radiation from the object and for forming a first detection image thereof on solely one of said arrays, second auxiliary optical means defining a second optical path for radiation from the object and for forming a second detection image thereof on solely the other of said arrays, the positions and radiation distributions of said detection images on the corresponding arrays changing with changes in the relative positions of said auxiliary means and said arrays, and with changes in the object distance, there being for each such distance a one of the last-mentioned positions at which there is best correspondence of said distributions on said arrays, scanning means for relatively moving at least a portion of at least one of said auxiliary means and the corresponding one of said arrays progressively through a predetermined range of relative positions during a time period, said range including said one position at which there is said best correspondence of said distribution on said arrays for the existing object distance, signal processing means connected to said elements for comparing the signal from each of said elements of one of said arrays with the signal from the positionally corresponding one of said elements of the other of said arrays, and for summing the results of such comparisons to provide an output signal which exhibits a predetermined effect when said best correspondence of said distributions on said arrays is obtained during said period, primary optical means arranged for producing a primary image of the object on an image plane and capable of adjustment into any of a plurality of positions, said primary image being in best focus on said plane when the position of said primary optical means corresponds to the one of said relative positions in said range at which said effect is produced during said period, and responsive means including first means coupled to said signal processing means and said scanning means and responsive to said effect and to said relative movement of said auxiliary means and said arrays to effectively ascertain at which of said relative positions in said range said effect is produced during said period, and including second means coupled to said primary optical means to effectively ascertain the instantaneous position thereof, to compare said two ascertained positions, and to adjust said primary optical means as necessary to make said ascertained positions correspond.

14. Apparatus as specified in claim 13, wherein one of said auxiliary means includes a movable optical element, and wherein said scanning means include means coupled to said optical element for moving the latter relative to the corresponding one of said arrays to provide said relative movement and range of relative positions.

15. Apparatus as specified in claim 14, wherein said first means include means for determining the time interval between the start of said period and the occurrence therein of said effect in said output signal, and said second means include third means for producing a second effect at a time after the start of said period dependent upon the position of said primary optical means relative to said plane at the time of the production of said second effect, fourth means for determining the time interval between the start of said period and the production of said second effect, said two time intervals being substantially equal when said primary optical means occupies said position in which said primary image is in best focus on said plane, motor means coupled to said primary optical means for moving the latter when said motor means is energized, and fifth means for comparing said two time intervals in said period and for energizing said motor means until the time interval determined by said fourth means is substantially equal to the time interval determined by said first means.

16. Apparatus as specified in claim 14, wherein said first means include means for providing an optical element signal which rises progressively in value from a datum value during said period as said optical element is moved progressively through said range of positions, and for holding the value which said optical element signal has reached in said period at the time of the occurrence of said effect in said output signal, and wherein said second means include third means for providing a primary optical means signal of a value dependent upon the instantaneous position of said primary optical means relative to said plane, the last-mentioned value achieving a predetermined relationship with said held value of said optical element signal when said primary optical means occupies said position in which said primary image is in best focus on said plane, motor means coupled to said primary optical means for moving the latter when said motor means is energized, and comparing means connected to compare the value of said primary optical means signal with said held value of said optical element signal, and to energize said motor means until said predetermined relationship is established.

17. Apparatus as specified in claim 16, wherein said primary optical means is the taking lens of a photographic camera, and wherein said plane is the film plane of said camera.

18. Apparatus as specified in claim 16, wherein said means for providing said optical element signal includes a signal integrator, and wherein said optical element signal is the output of said integrator.

* * * * *